United States Patent
Behin et al.

(10) Patent No.: US 7,023,604 B2
(45) Date of Patent: Apr. 4, 2006

(54) THREE DIMENSIONAL OPTICAL SWITCHES AND BEAM STEERING MODULES

(75) Inventors: Behrang Behin, Berkeley, CA (US); Robert Conant, Berkeley, CA (US); Michael J. Daneman, Pacifica, CA (US); David Horsley, Berkeley, CA (US); Meng-Hsiung Kiang, Berkeley, CA (US); David Lerner, Corte Madera, CA (US); Satinderpall Pannu, Berkeley, CA (US)

(73) Assignee: Analog Devices, Inc., Norwood, MA (US)

( * ) Notice: Subject to any disclaimer, the term of this patent is extended or adjusted under 35 U.S.C. 154(b) by 563 days.

(21) Appl. No.: 09/812,066

(22) Filed: Mar. 17, 2001

(65) Prior Publication Data
US 2002/0097478 A1 Jul. 25, 2002

Related U.S. Application Data

(63) Continuation-in-part of application No. 09/536,164, filed on Mar. 25, 2000, now Pat. No. 6,330,102.

(51) Int. Cl.
 *C02B 26/00* (2006.01)
 *C02B 26/08* (2006.01)
 *C02B 6/26* (2006.01)

(52) U.S. Cl. .................. 359/290; 359/226; 385/17; 385/18

(58) Field of Classification Search ................ 359/290, 359/291, 292, 223–226, 295, 298, 296; 385/17, 385/18, 16
See application file for complete search history.

(56) References Cited

U.S. PATENT DOCUMENTS

| | | | |
|---|---|---|---|
| 4,334,437 A | 6/1982 | Andersson | 330/4.3 |
| 4,761,543 A | 8/1988 | Hayden | 235/457 |
| 4,938,555 A | 7/1990 | Savage | 350/96.15 |
| 5,168,535 A | 12/1992 | Laor | 385/16 |
| 5,621,829 A | 4/1997 | Ford | 385/22 |
| 5,872,880 A | 2/1999 | Maynard | 385/88 |
| 5,930,027 A | 7/1999 | Mentzer et al. | 359/298 |
| 5,963,682 A | 10/1999 | Dorschner et al. | 385/16 |
| 6,005,993 A | 12/1999 | MacDonald | 385/16 |
| 6,005,998 A | 12/1999 | Lee | 385/33 |
| 6,042,240 A | 3/2000 | Strieber | 359/851 |
| 6,084,714 A | 7/2000 | Ushiyama et al. | 359/627 |

(Continued)

FOREIGN PATENT DOCUMENTS

| | | |
|---|---|---|
| DE | 296118818 | 12/1996 |
| DE | 19757181 A | 7/1997 |
| DE | 19644918.9 | 4/1998 |
| EP | 0159406 A1 | 2/1981 |
| EP | 113302 A | 4/2001 |
| GB | 2178869 A | 2/1987 |
| JP | 1102515 | 4/1989 |
| WO | WO9809289 | 3/1998 |
| WO | 9966354 | 12/1999 |
| WO | 0195007 | 12/2001 |

*Primary Examiner*—Ricky L. Mack
(74) *Attorney, Agent, or Firm*—JDI Patent; Joshua D. Isenberg

(57) ABSTRACT

A beam steering module comprised of a mirror stack array in close proximity to a collimator array controllably steers photons along two axis and in a direction substantially less than 90 degrees to the collimator orientation. Several configurations of the module are described using single and double axis mirror rotation and relay optics. Optical telecommunications switches are shown using modules coupled to each other along flat and curved surfaces, with and without use of fold mirror and enabling a plurality of configuration options including photodetector optical power monitoring schemes that require no external power taps.

43 Claims, 26 Drawing Sheets

U.S. PATENT DOCUMENTS

| | | | |
|---|---|---|---|
| 6,097,859 A | 8/2000 | Solgaard et al. | 385/17 |
| 6,097,860 A | 8/2000 | Laor | 385/17 |
| 6,188,814 B1 | 2/2001 | Bhalla | 385/15 |
| 6,212,309 B1 | 4/2001 | Nguyen et al. | 385/17 |
| 6,253,001 B1 | 6/2001 | Hoen | 385/17 |
| 6,259,835 B1 | 7/2001 | Jing | 358/18 |
| 6,330,102 B1 | 12/2001 | Daneman et al. | 359/290 |
| 6,388,789 B1 | 5/2002 | Bernstein | 359/198 |
| 6,421,160 B1 * | 7/2002 | Ham | 359/245 |
| 6,480,645 B1 * | 11/2002 | Peale et al. | 385/18 |
| 6,483,961 B1 * | 11/2002 | Helkey et al. | 385/18 |
| 6,507,683 B1 * | 1/2003 | Sugitatsu et al. | 385/18 |
| 6,522,802 B1 * | 2/2003 | Hoen | 385/18 |
| 6,567,574 B1 * | 5/2003 | Ma et al. | 385/16 |
| 2004/0042716 A1 * | 3/2004 | Dames | 385/31 |

* cited by examiner

1700

THREE DIMENSIONAL OPTICAL SWITCHES AND BEAM STEERING MODULES

CROSS-REFERENCE TO RELATED APPLICATIONS

This application is a continuation-in-part of U.S. patent application Ser. No. 09/536,164 to Michael J. Daneman, Berhang Behin, and Satinderpall S. Pannu, filed Mar. 25, 2000 now U.S. Pat. No. 6,330,102 and entitled "Apparatus and method for 2-Dimensional Steered-Beam N×M Optical Switch Using Single-Axis Mirror Arrays and Relay Optics", which is incorporated herein by reference.

FIELD OF THE INVENTION

This invention relates generally to fiber optic communications. More particularly, the invention relates to optical routing.

BACKGROUND ART

Modern fiber optical communications systems direct optical signals over multiple fibers. Such systems require optical switches to direct light beams from any given fiber in an input fiber array to any given fiber in an output array. One class of optical switches uses an approach called beam steering. In beam steering, the light from the fiber is selectively deflected or steered by one or more movable optical element from the input fiber to the output fiber. Suitable optical elements include microelectromechanical system (MEMS) mirrors. MEMS mirrors are usually actuated by magnetic interaction, electrostatic, or piezoelectric interaction. Typically, two sets of moveable mirrors are used to steer the beam. Each fiber has a small "acceptance window". The fiber only efficiently couples light that is incident within a narrow range of angles and positions. Although a single mirror will generally direct the beam from an input fiber to the correct output fiber, two mirrors ensure that the light beam enters the output fiber at the correct angle. If the beam makes too large an angle with the axis of the fiber, light from the beam will not couple properly to the fiber, i.e. there will be high losses.

Optical switches using the steering-beam approach have been demonstrated in two primary implementations. The first uses linear arrays of mirrors with a single angular degree of freedom. Combining two such mirror arrays as shown in FIG. 1 allows an implementation of an N×N optical switch, where the number of input and output channels is equal to the number of mirrors in each array. The first array steers an optical beam from an input fiber to the appropriate mirror on the second array, which then steers the beam into the corresponding output fiber. This implementation uses simple single-axis mirrors; however, it is limited in its scalability since the optical path between fibers becomes unreasonably large for large port counts (e.g. >32×32), increasing the loss of the switch.

The second implementation depicted in FIG. 2 uses two sets of 2-dimensional mirror arrays, each mirror having two angular degrees of freedom. The input and output fibers are each also arranged in a 2-dimensional grid with the same dimension as the mirror arrays. The mirrors in the first mirror array steer the optical beams from the fibers onto the appropriate mirror in the second mirror array which then steers the beam into the corresponding fiber. This approach is considerably more scalable, since, due to its 2-dimensional layout, the size of the mirror and fiber arrays grows as the square root of the number of input/output ports, which is much slower than in the case of a 1-dimensional grid. Therefore, switches with much larger port count (>2000×2000) are possible. However, this implementation requires the mirrors to rotate about two different axes. Such mirrors are considerably more difficult to design, fabricate, and control.

Prior art beam steering approaches as shown in FIG. 1 typically deflect light ~90 degrees to another deflector which deflects the light at an offset of 90 degrees such that input and output fiber arrays are substantially parallel. Such beam steering optical switches deflect photons from an input to the output mirror array where the deflected light from the input mirror array causes the beam to be substantially perpendicular to the input fiber array. These designs are not modular, are limited in the number of ports they can physically occupy, and are subject to a fixed geometry.

Another disadvantage of existing optical switches is that they tend to be monolithic in design, i.e., the mirror arrays are fixed components of the switch that are neither removable nor interchangeable. As a result, a prior art switch cannot easily be reconfigured or repaired.

There is a need, therefore, for a beam steering apparatus that overcomes the above disadvantages.

SUMMARY

These disadvantages associated with the prior art may be overcome by a beam steering module. The steering module generally comprises first and second N×M arrays of single axis mirrors. The mirrors in the first array rotate about a particular axis while the mirrors in the second array rotate about an axis different from the first axis (. Relay optics may be disposed between the two arrays image the first mirror array onto the second mirror array such that the beam angle may be controlled with respect to both axes by adjusting the angle of the appropriate mirrors in the first and second mirror grids.

Two steering modules may be combined to form a beam steering system. With two modules, it is possible to completely determine, at the plane of the output fiber grid, the position and angle of an optical beam emerging from any of the input fibers.

Embodiments of the steering modules of the present invention may be used to selectively couple light from an input fiber in an N×N input fiber module array to any output fiber in an M×M output fiber module array, or from an input fiber to an output fiber in an N×N module array. The beam steering modules of the present invention may be used interchangeably to achieve full-duplex operation modules functioning as inputs and outputs.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

The optical switch system according to embodiments of the present invention may switch light from any of a set of input fibers into any of a set of output fibers in a non-blocking fashion using beam steering modules.

Figure 4:
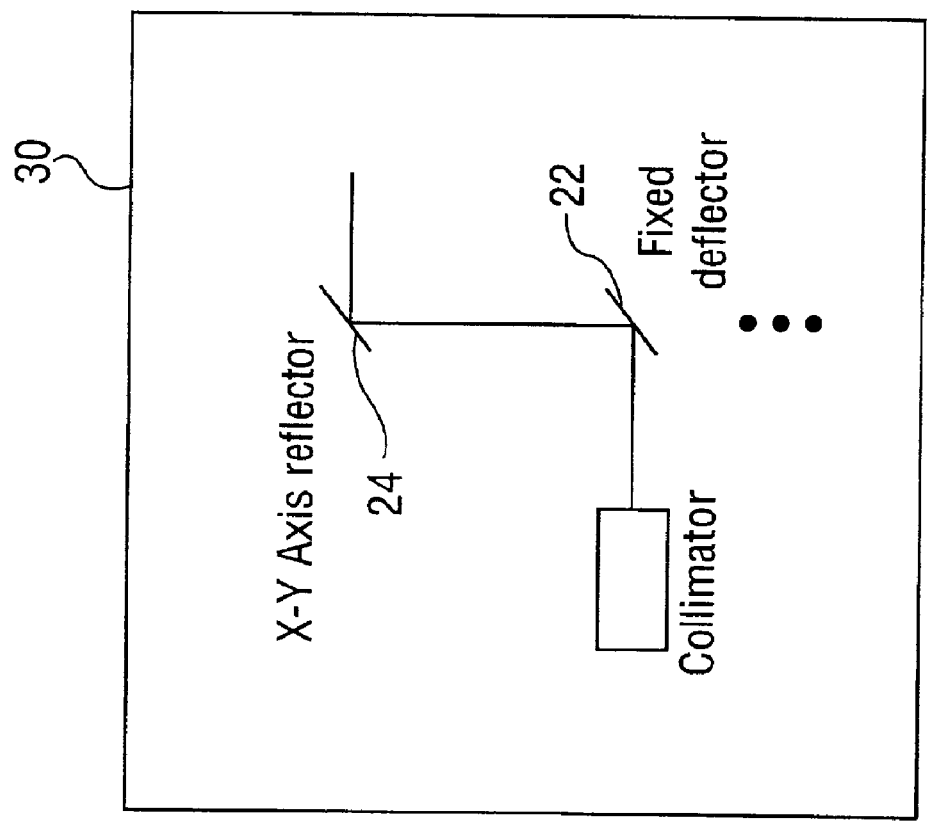
FIGS. 4 depicts an isometric view of a beam steering apparatus according to a second embodiment of the present invention.
Figure 3:
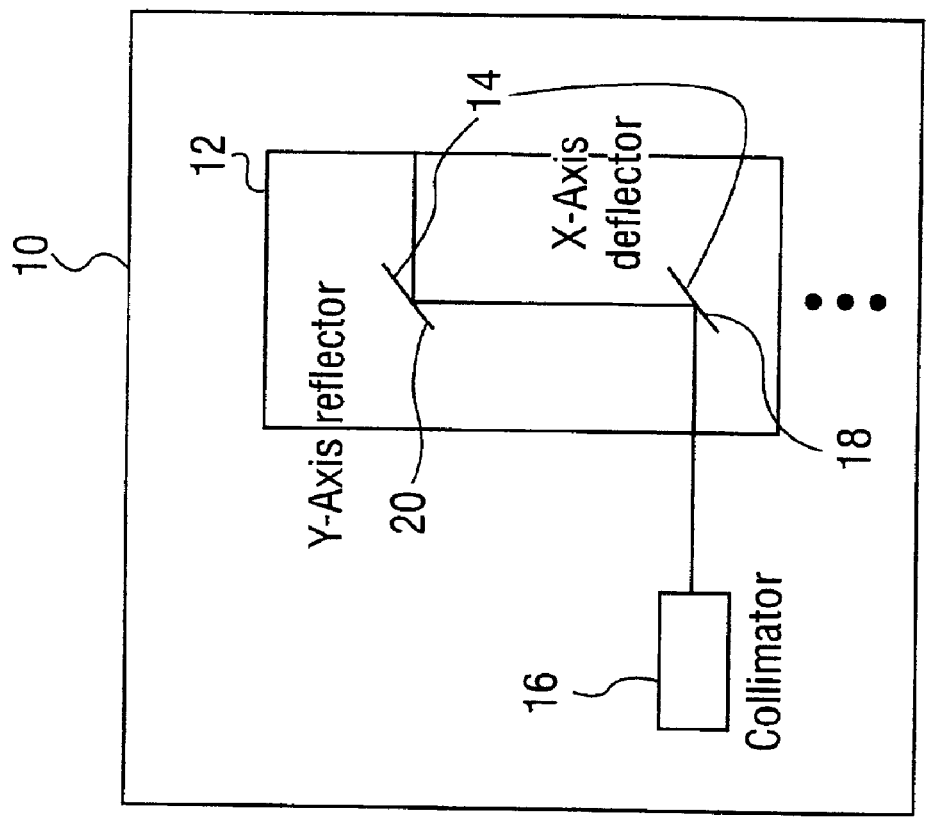
FIG. 3 depicts a beam steering module according to a first embodiment of the present invention.

Steering modules can switch a plurality of paths independent of the current configuration of the switch. FIG. 3 depicts a steering module 10 according to a first embodiment of the present invention. Module 10 may generally comprise beam steering element 12 configured with at least one pair of deflective elements 14. Photons may enter the module through a collimator 16 and coupled through a first deflective element 18 which may steer the photons along an axis to a second deflective element 20 which may also steer the photons along a second axis. FIG. 4 shows an alternate configuration having one fixed deflective element 22 coupled to a double-gimbaled deflector 24. Both module configurations are capable of steering photons along two axis in a manner substantially parallel to the orientation of the input collimator.

Generally, the deflective elements are individually addressable, created using MEMs fabrication methods and actuated using a variety of known actuation methods, including but not limited to, electrostatic and magnetic types.

Figure 5:
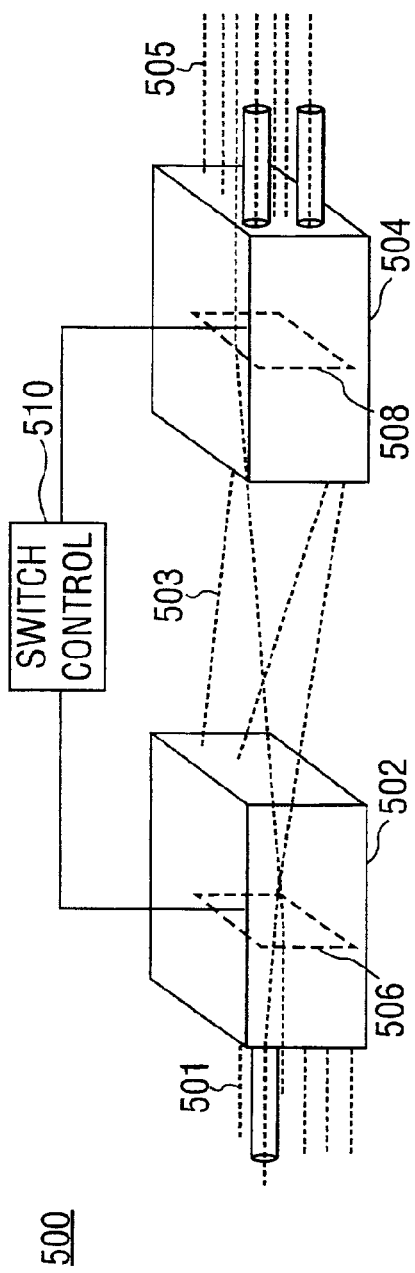
FIG. 5 depicts a schematic diagram depicting a modular optical switch according to a first alternative version of a third embodiment of the invention.

The present invention includes a third embodiment directed to a modular optical switch. By way of example, FIG. 5 schematically depicts a modular switch 500 according to first alternative version of the third embodiment. The switch 500 may generally comprise a first beam steering module 502 optically coupled to a second beam steering module 504. First and second sets of optical fibers 501, 505 may be respectively coupled to the first and second modules 502, 504 e.g., via one or more I/O ports. The beam steering modules 502, 504 may respectively include one or more beam steering elements 506, 508. The I/O ports may include individual or arrayed collimators to facilitate couple of optical signals between the fibers 501, 505 and the beam steering elements 506, 508. The beam steering elements 506, 508 may deflect one or more optical signals 503 in two dimensions such that an optical signal may be selectively routed between any of the first fibers 501 to any of the second fibers 505. The beam steering elements 506, 508 may be configured such that the modules 502, 504 are substantially horizontally opposed, e.g., with the I/O ports on the first module 502 substantially parallel to the I/O ports on the second module 504.

The first and second modules 502, 504 may be operated under the direction of a controller 510. The controller may be coupled to the beam steering elements 506, 508 by electrical optical or mechanical linkage. The controller may be implemented in hardware, software, firmware or some combination of these. The controller 510 may provide control signals to the beam steering elements to allow selective coupling of the optical signals 503 between the first module 502 and the second module 503 or vice versa.

The modules 502, 504 can co-operate interchangeably with each other, and with fixed or movable deflector elements, in several ways. First, the modules 502, 504 may be removably attached to a frame, housing or substrate such that may be replaced to facilitate repair or upgrade. Second, the modules 502, 504 may be of a standardized configuration, e.g. with standardized dimensions, numbers of I/O ports, to facilitate design of new optical switches and other beam steering devices. Third, the beam steering elements 506, 508 may be removably attached to the modules 502, 504 to facilitate repair or upgrade. Fourth, the beam steering elements may be of a standardized configuration to facilitate the design of new optical switches and other devices.

Figure 6A:
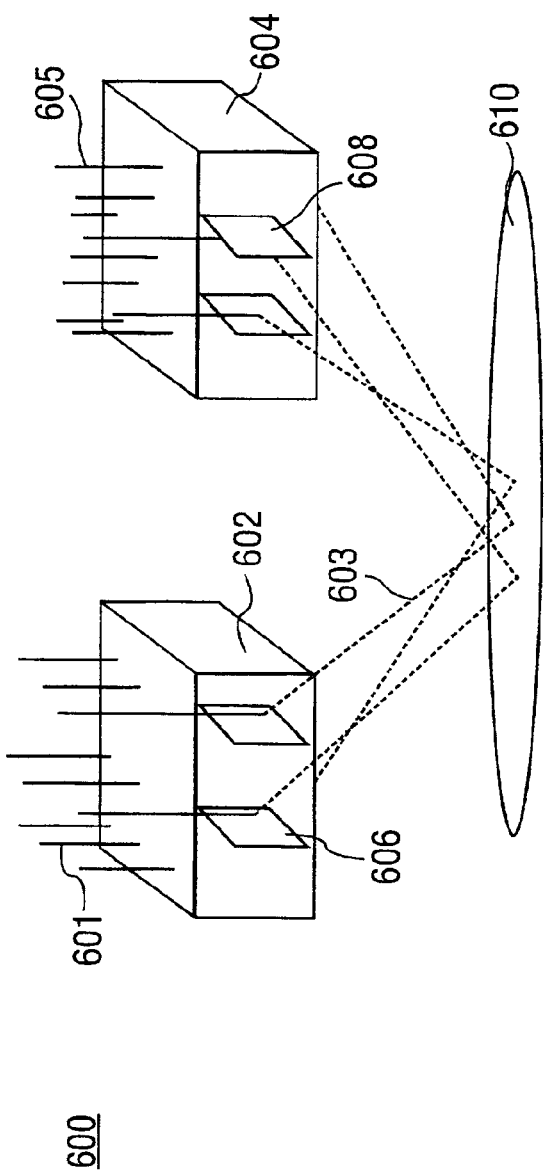
FIGS. 6A–6B depicts a modular optical switch according to a second alternative version of the third embodiment of the invention.

Although, FIG. 5 depicts a switch having horizontally opposed modules, the invention is in no way limited to this configuration. By way of example, FIG. 6A depicts an optical switch 600 according to a second alternative version of the third embodiment. The optical switch 600 may generally include a first beam steering module 602 optically coupled to a second beam steering module 604 via a fold deflector 610. First and second sets of optical fibers 601, 605 may be respectively coupled to the first and second modules 602, 604 e.g., via one or more I/O ports. The beam steering modules 602, 604 may respectively include one or more beam steering elements 606, 608 optically coupled to each other via the fold deflector 610. The beam steering elements 606, 608 may deflect one or more optical signals 603 in two dimensions such that an optical signal may be selectively routed between any of the first fibers 601 to any of the second fibers 605 via the fold deflector 610.

Figure 6B:
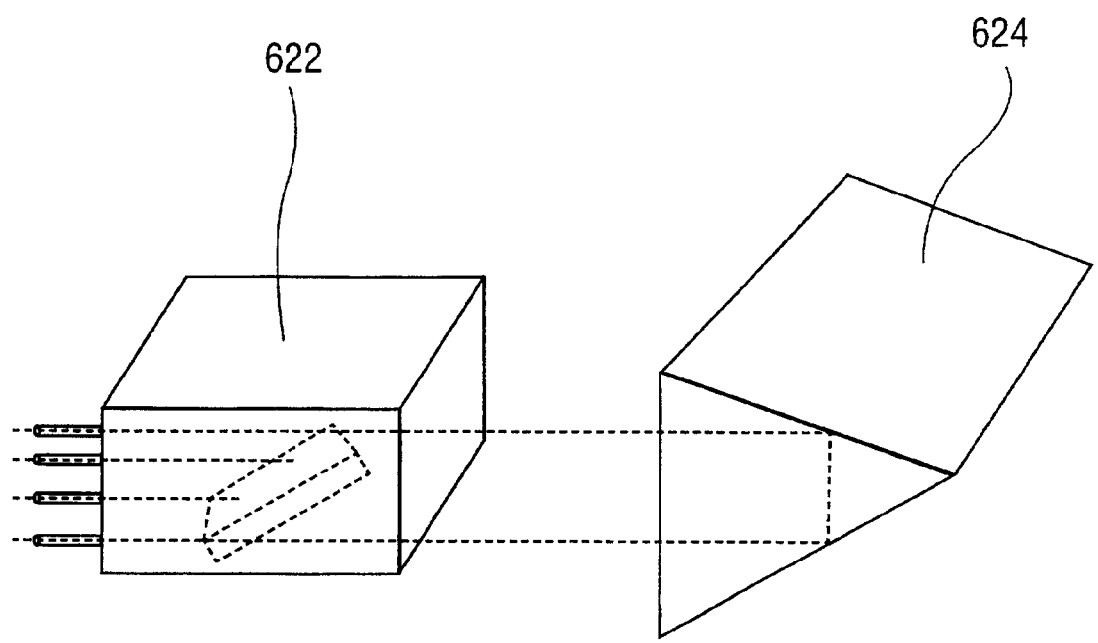

The fold deflector 610 may be a reflective element, such as a flat or curved mirror. Alternatively, the fold deflector 610 may be a refractive element such as a prism or a diffractive element such as a grating. Furthermore, the fold deflector 610 may include some combination reflective, refractive and diffractive elements. The fold deflector 610 may allow flexibility in the spatial positioning of the modules 602, 604 within the switch 600. Alternatively, as shown in FIG. 6B a fold deflector 624 may be used with a single module 622 to provide an optical switch 620. Fold deflector 624 may be made of a partially transparent material to allow a small percentage of light to pass behind the mirror into a photodetector array, and the photodetector array may be connected to a switch control 510 for controllably operating the input and output beam steering elements in response to the power monitoring signals generated therefrom said photodetector array.

One alternative method for controllably operating the input and output beam steering elements in response to power monitoring includes an array of photodetectors clusters situated around each collimator. This arrangement may track photons not coupled into an output collimator and provide beam steering telemetry to the switch control for calibrating the input and output beam steering elements for maximum coupling. A photodetector array can be designed with a mask that centers each cluster array at referential points at locations corresponding to each collimator. A cluster may be comprised of a plurality of photodetectors, CCD, three or four individually addressable detectors. When using individually addressable photodetectors, optical insertion losses can be minimized by drilling or etching holes in precise referential locations corresponding to the location of the collimators on the module to allow the light to pass through the center of the cluster into the collimator.

Figure 7A:
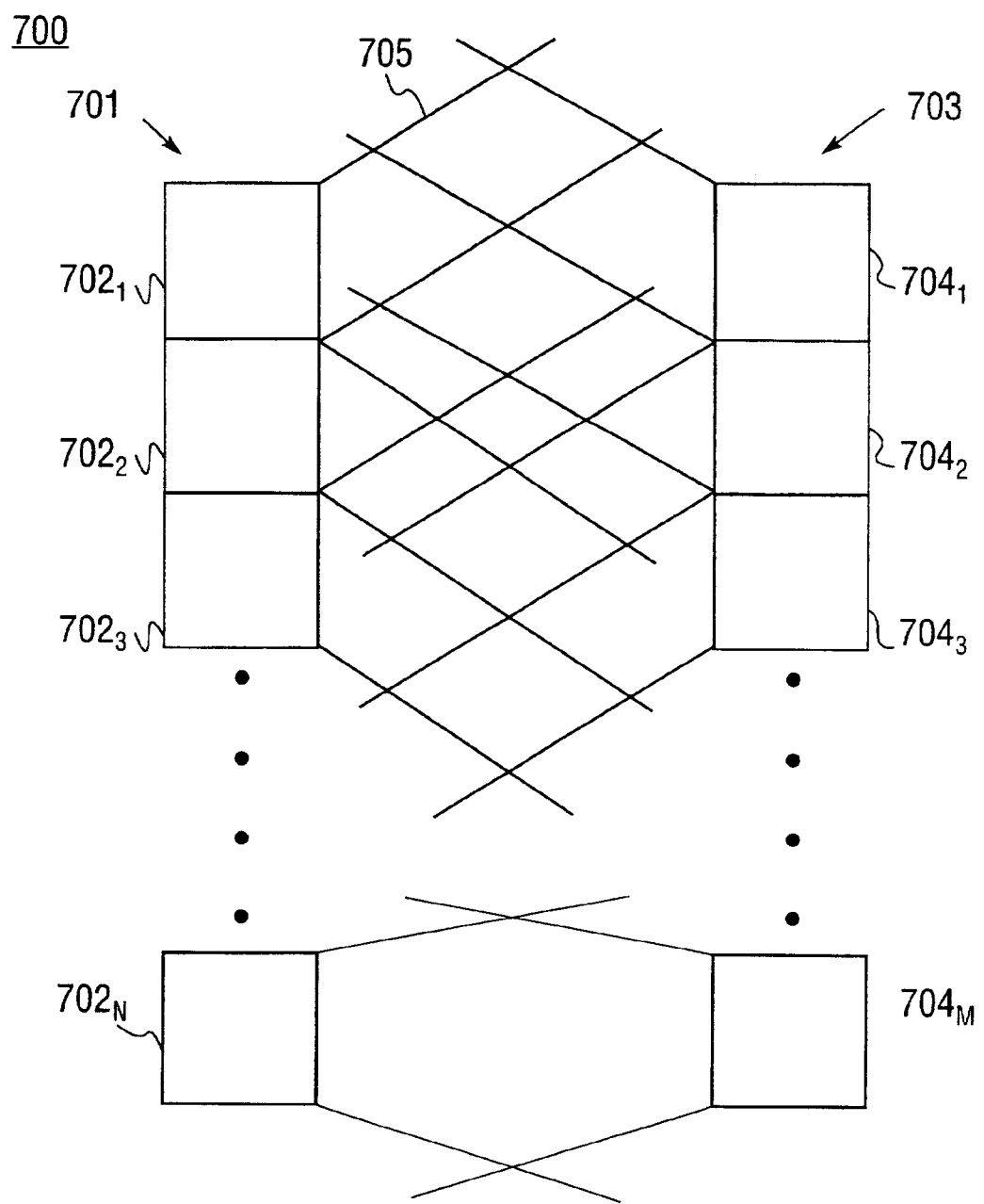
FIG. 7A depicts a schematic diagram of a modular optical switch employing stacked beam steering modules according to a third alternative version of the third embodiment of the invention.

Although FIG. 5 and FIG. 6 depict switches having only two modules, the present invention is in no way limited to these particular configurations. By way of example, FIG. 7A depicts an optical switch 700 according to a third alternative version of the third embodiment. The optical switch 700 may generally comprise a first stack 701 of N beam steering modules $702_1, 702_2 \ldots 702_N$, where N is an integer greater than or equal to 1. The modules in the first stack 701 may be optically coupled to a second stack 703 of M beam steering modules $704_1, 704_2 \ldots 704_M$, where N is an integer greater than or equal to 1. M and N may be the same or they may be different numbers. Note that if each of the modules is capable of a sufficiently large angle of deflection of optical signals 705 any module in the first stack may be coupled to any module in the second stack. Although one-dimensional stacks 701, 703 are depicted in FIG. 7A for the sake of clarity, the modules may alternatively be arranged in two-dimensional arrays.

Figure 7B:
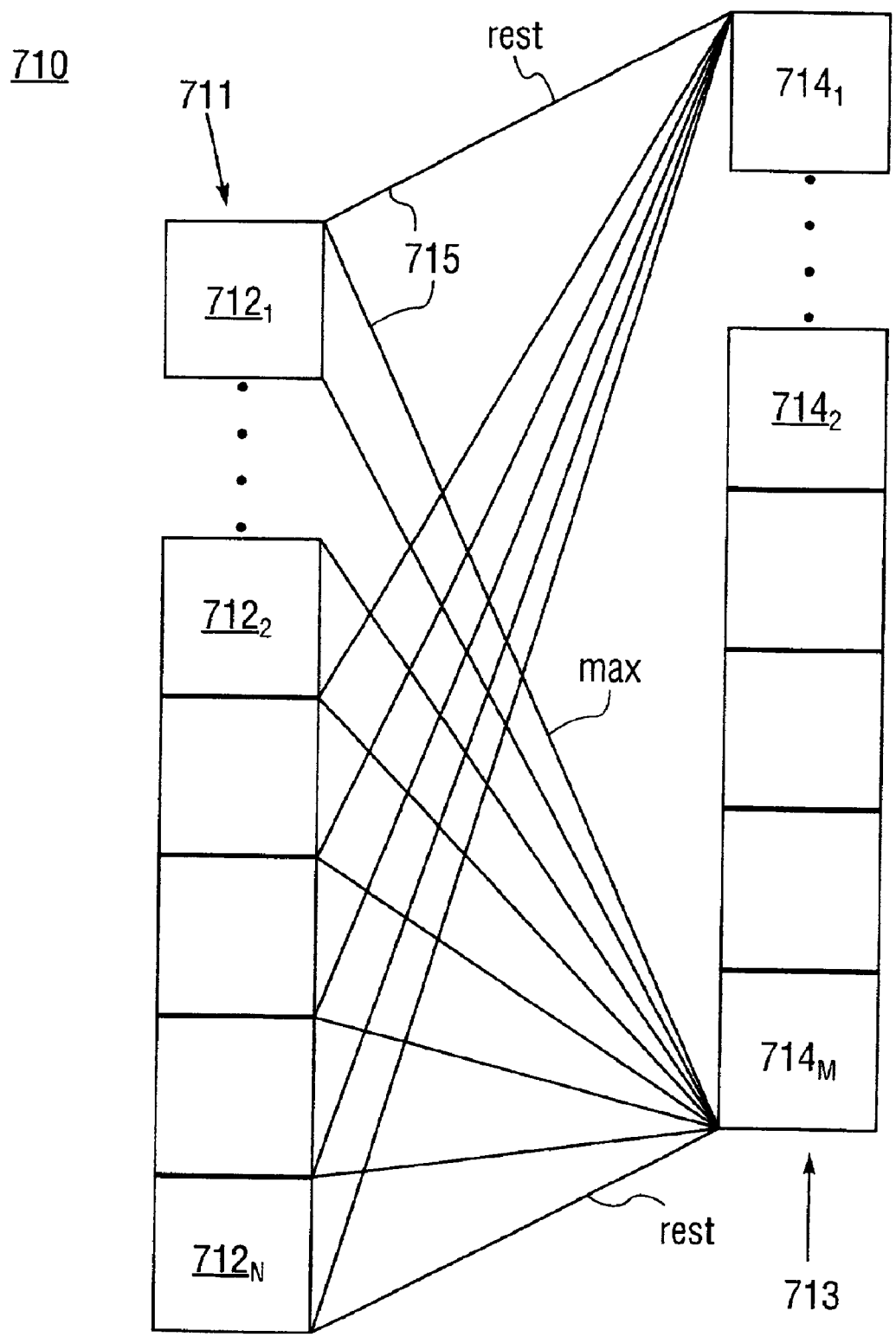
FIG. 7B depicts a schematic diagram of a modular optical switch employing offset stacked beam steering modules according to a fourth alternative version of the third embodiment of the invention.

FIG. 7A depicts a modular switch in which the beam steering elements may scan to the left and right of a center rest position. An example of such a beam steering element could include an array of MEMs mirrors that operate by "push-pull" actuation. Alternatively, the beam steering elements may scan "one way," i.e., only in a sector to the left, or only to the right, of an end rest position. In such a case it may be desirable to offset the alignment of the first and second stacks of modules. FIG. 7B depicts an optical switch 710 according to a fourth alternative version of the third embodiment wherein the beam steering modules are offset. The optical switch 710 may generally comprise a first stack 711 of N beam steering modules $712_1, 712_2 \ldots 712_N$, where N is an integer greater than or equal to 1. The modules in the first stack 711 may be optically coupled to a second stack 713 of M beam steering modules $714_1, 714_2 \ldots 714_M$. The modules in the second stack 713 may be in an offset alignment with respect to the modules in the first stack. The offset alignment may compensate higher density port count when steering optical signals 715 with "one way" scanning capability in the beam steering modules. Optical signals corresponding to the rest and maximum deflections are shown for modules at opposite ends of the two stacks. Note that if each of the modules is capable of a sufficiently large angle of deflection of the optical signals 715 any module in the first stack may be coupled to any module in the second stack. Although one-dimensional stacks 711, 713 are depicted in FIG. 7B for the sake of clarity, the modules may alternatively be arranged in two-dimensional arrays.

Figure 7C:
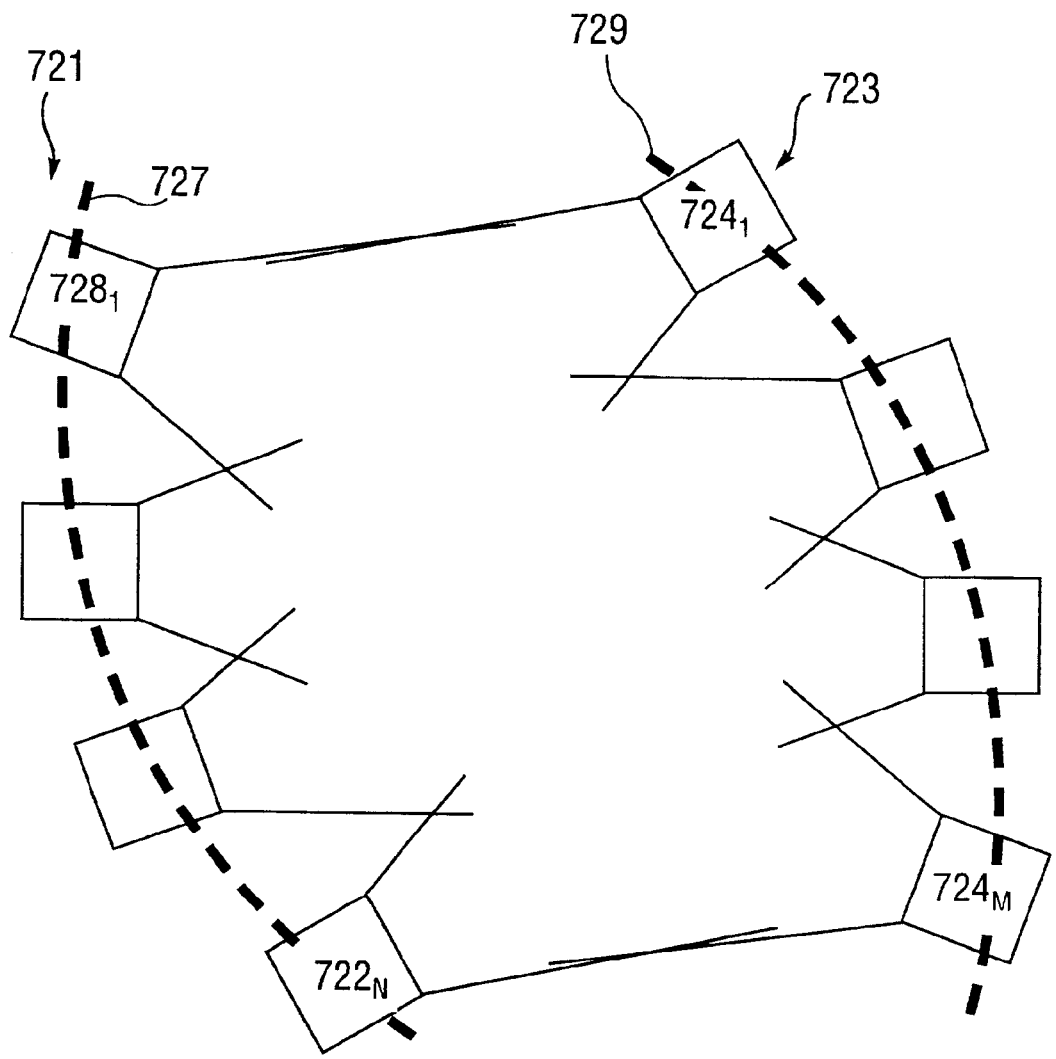
FIG. 7C depicts a schematic diagram of a modular optical switch employing beam steering modules distributed along a curve according to a fifth alternative version of the third embodiment of the invention.

The modular switches depicted in FIGS. 7A, 7B may have substantially linear stacks or planar arrays of modules. In some applications, if the number of modules N becomes sufficiently large modules at opposite ends of the stacks may not be able to "see" one another. In such applications it may be desirable to distribute the stacks along one or more curves. FIG. 7C depicts an optical switch 720 according to a fifth alternative version of the third embodiment wherein the beam steering modules in at least one stack are distributed along a curve. The optical switch 720 may generally comprise a first stack 721 of N beam steering modules $722_1$, $722_2 \ldots 722_N$, distributed substantially along a curve 727 where N is an integer greater than or equal to 1. The modules in the first stack 721 may be optically coupled to a second stack 723 of M beam steering modules $724_1, 724_2 \ldots 724_M$. The modules in the second stack 723 may be distributed along a second curve 729. The curved stacking of the modules can facilitate coupling between modules at extreme opposite ends of the stacks. By way of example, the curves 727, 729 may be in the shape of a segment of a circle, parabola, ellipse, hyperbola, cycloid, or any other suitable curved shape. Alternatively, one of the curves 727, 729 could be a segment of a straight line.

Although one-dimensional curved stacks are depicted in FIG. 7C for the sake of clarity, the switch 720 may employ two-dimensional curved arrays of modules, e.g. distributed across a curved surface. By way of example, the shape of the curved surface may be cylindrical, spherical, paraboloidal, ellipsoidal, hyperboloidal or any other suitable curved three-dimensional shape. Alternatively, one of the arrays of modules could be arranged in a planar array.

Figure 7D:
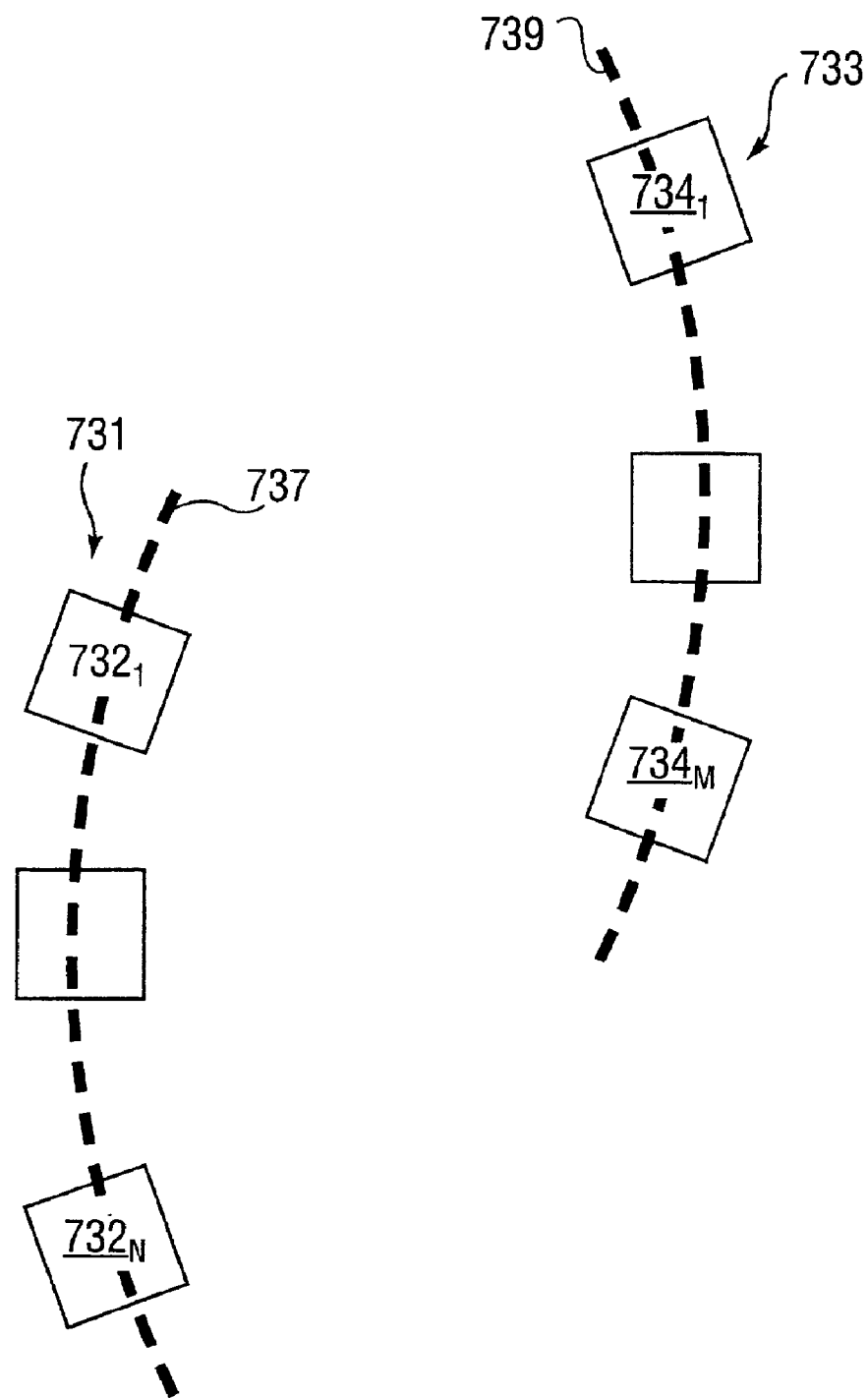
FIG. 7D depicts a schematic diagram of a modular optical switch employing offset beam steering modules distributed along a curve according to a sixth alternative version of the third embodiment of the invention.

FIG. 7D depicts an optical switch 730 according to a sixth alternative version of the third embodiment wherein offset beam steering modules distributed along a curve. The optical switch 730 may generally comprise a first stack 731 of N beam steering modules $732_1, 732_2 \ldots 732_N$, distributed substantially along a curve 737. The modules in the first stack 731 may be optically coupled to a second stack 733 of M beam steering modules $734_1, 734_2 \ldots 734_M$. N and M are integers greater than or equal to 1. The modules in the second stack 733 may be distributed along a second curve 739. The first and second curves 737, 739 may be in an offset alignment with respect to each other to facilitate coupling between modules at extreme opposite ends of the stacks By way of example, the curves 737, 739 may be in any shape, and not limited to those described above with respect to FIG. 7C.

Figure 7E:
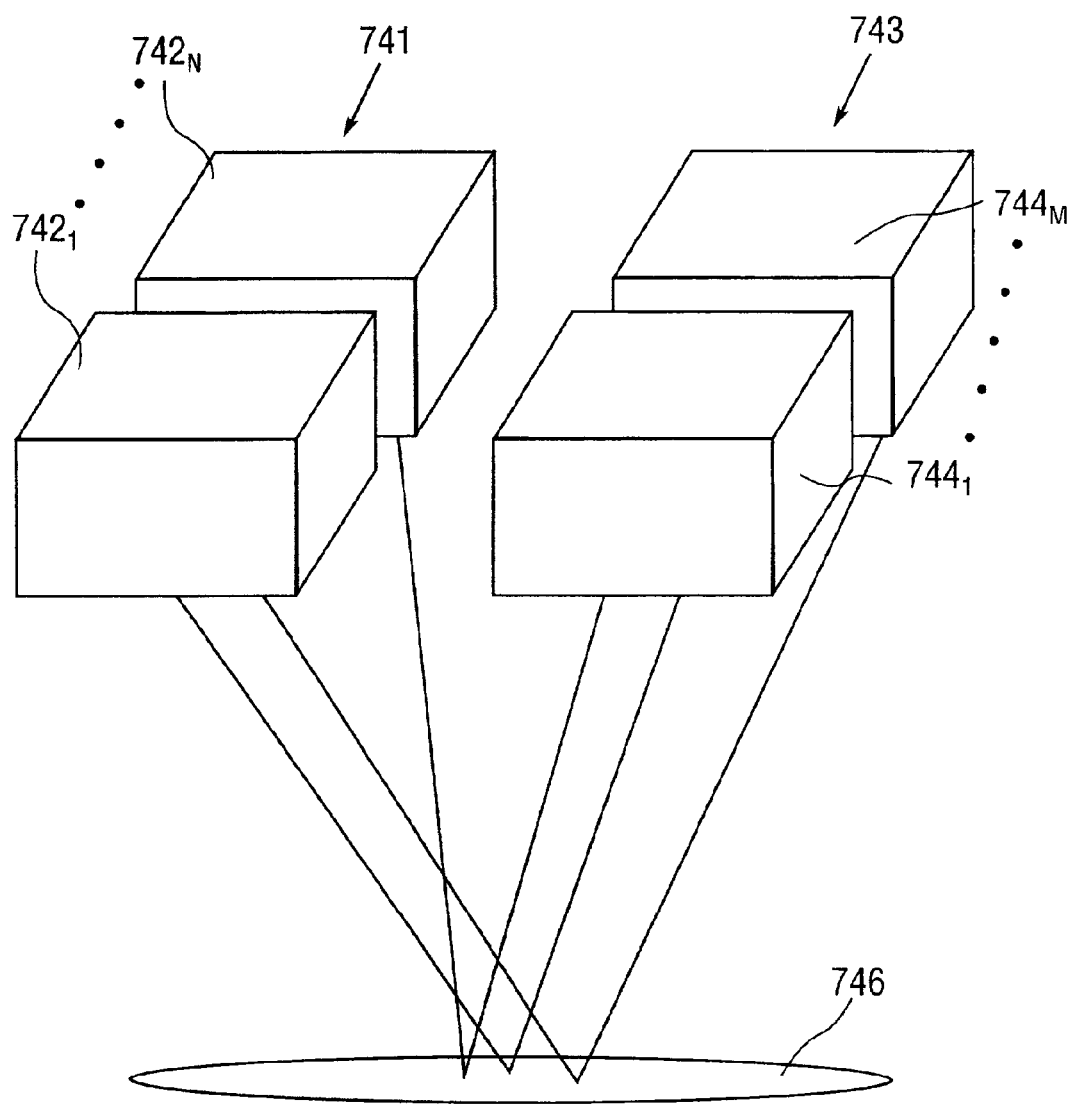
FIG. 7E depicts a schematic diagram of a modular optical switch employing stacked beam steering modules with a fold deflector according to a seventh alternative version of the third embodiment of the invention.

Multiple beam steering modules may be incorporated into an optical switch with a fold deflector. FIG. 7E depicts a schematic diagram of a modular optical switch 740 employing multiple beam steering modules with a fold deflector according to a seventh alternative version of the third embodiment of the invention. By way of example, the switch 740 includes first and second arrays 741, 743 of N and M modules $742_1$–$742_N$, $744_1$–$744_M$ respectively, where N and M are integers greater than or equal to 1. The modules in the arrays 741, 743 may be optically coupled to each other via a fold deflector 746. In the exemplary version depicted in FIG. 7E, the fold deflector 746 may be flat surface coated mirror. Alternatively the fold deflector 746 may be a refractive element, such as one or more prisms.

Figure 7F:
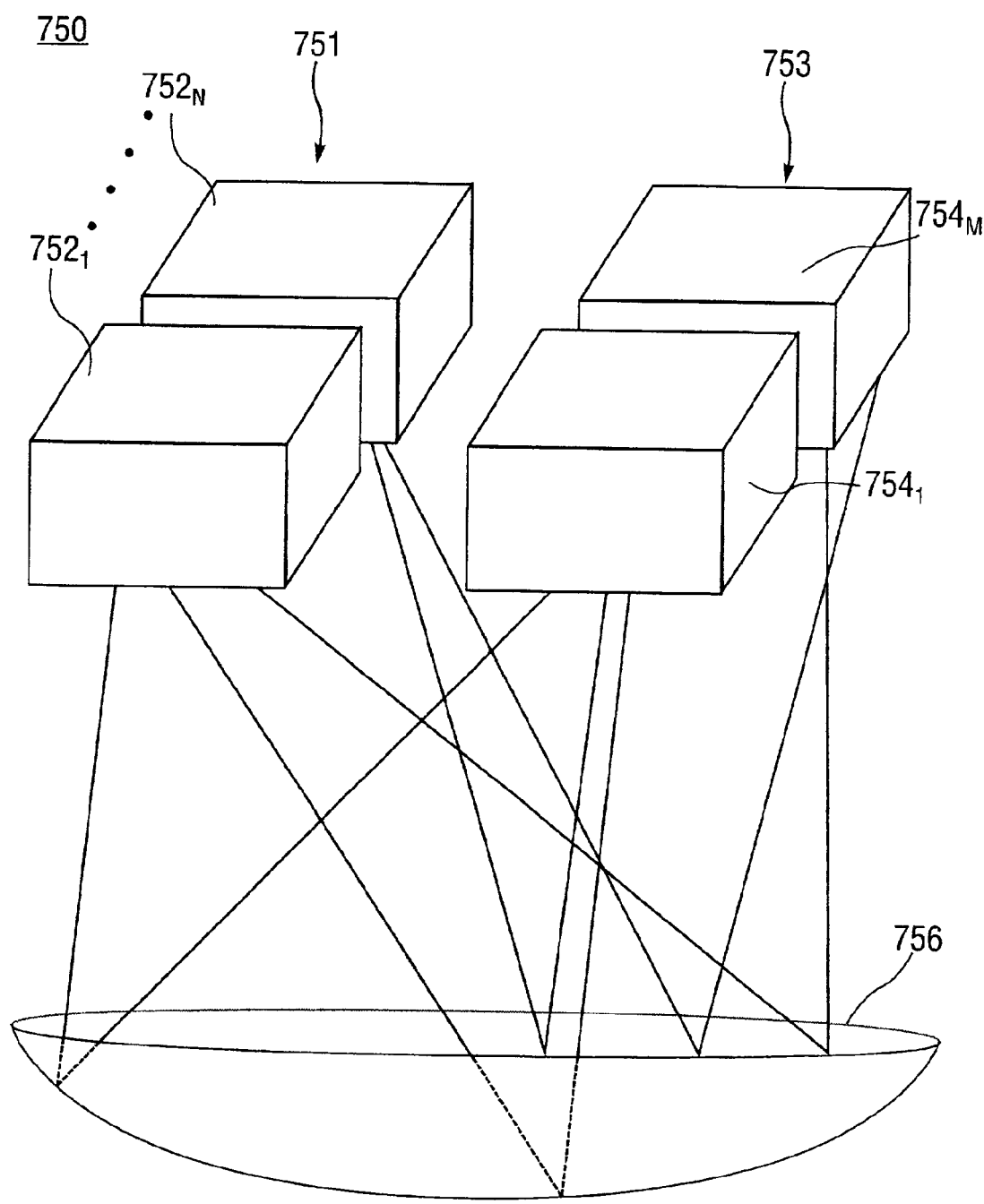
FIG. 7F depicts a schematic diagram of a modular optical switch employing stacked beam steering modules with a curved fold deflector according to a eighth alternative version of the third embodiment of the invention.

The fold deflector may alternatively be curved. FIG. 7F depicts a schematic diagram of a modular optical switch 750 that combines stacked beam steering modules with a curved fold deflector according to a eighth alternative version of the third embodiment of the invention. By way of example, the switch 750 may include first and second arrays 751, 753 of N and M modules $752_1$–$752_N$, $754_1$–$754_M$ respectively, where N and M are integers greater than or equal to 1. The modules in the arrays 751, 753 may be optically coupled to each other via a curved fold deflector 746. In the exemplary version depicted in FIG. 7F, the fold deflector 756 is a curved surface coated mirror. Alternatively the fold deflector 756 may include a refractive element, such as one or more prisms.

Figure 7G:
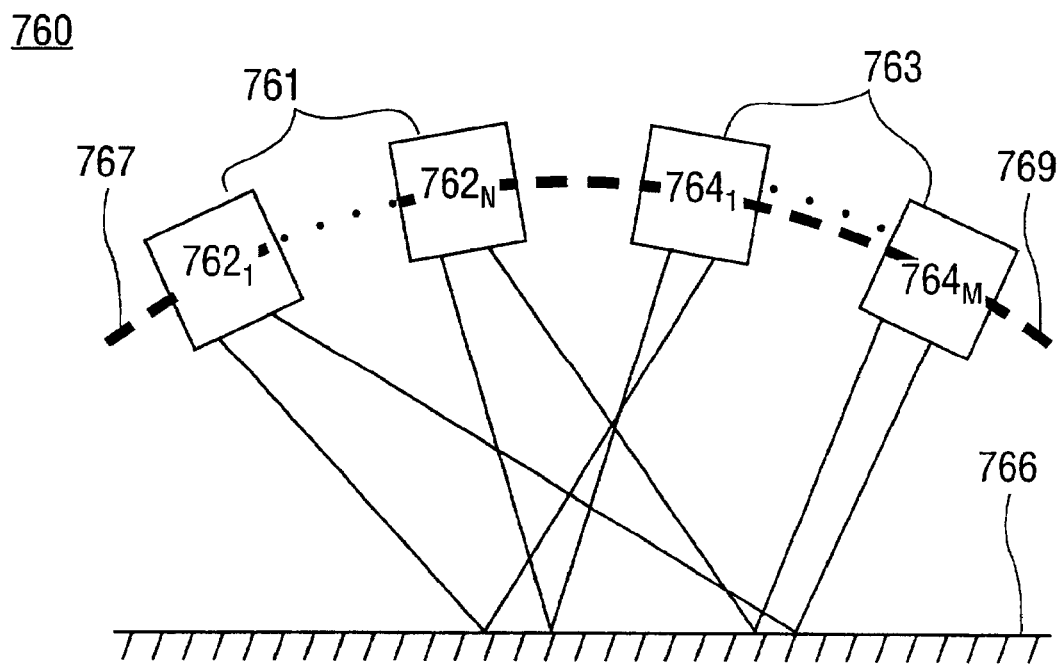
FIG. 7G depicts a schematic diagram of a modular optical switch employing a curved array of beam steering modules with a fold deflector according to a ninth alternative version of the third embodiment of the invention.

Fold deflectors may also be combined with modules displaced along a curve or spline. By way of example, FIG. 7G depicts a schematic diagram of a modular optical switch 760 that employs a curved array of beam steering modules with a fold deflector according to a ninth alternative version of the third embodiment of the invention. By way of example, the switch 760 may include first and second arrays 761, 763 of N and M modules $762_1$–$762_N$, $764_1$–$764_M$ respectively, where N and M are integers greater than or equal to 1. The modules in the arrays 761, 763 are distributed along curves 767, 769 respectively. The curves 767, 769 may have any 2-dimensional or 3-diemensional curved shape, including those described above with respect to FIG. 7C. Alternatively, the modules $762_1$–$762_N$, $764_1$–$764_M$ may be distributed along the same curved surface or different portions of the same curved surface. The modules in the arrays 761, 763 may be optically coupled to each other via a fold deflector 766. In the exemplary version depicted in FIG. 7G, the fold deflector 766 is a flat mirror. Alternatively the fold deflector 766 may include a refractive element, such as one or more prisms.

Fold deflector 766 may be made of a partially transparent material to allow a small percentage of light to pass behind the mirror into a photodetector array, and the photodetector array may be connected to a switch control 510 for controllably operating the input and output beam steering elements in response to the power monitoring signals generated therefrom said photodetector array.

Figure 7H:
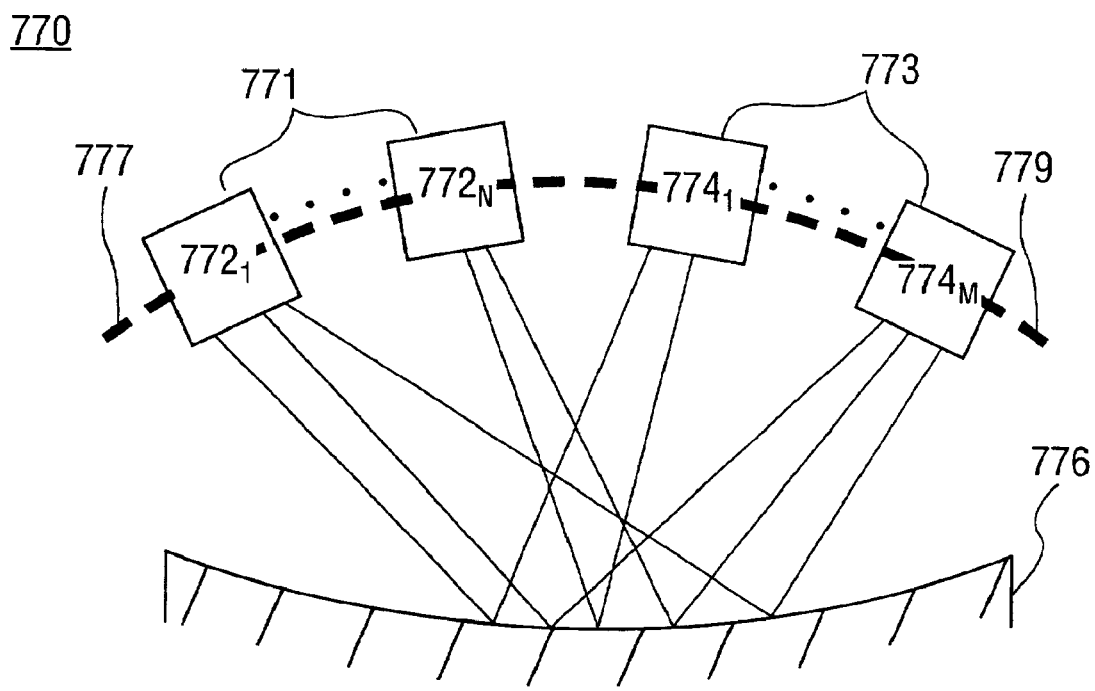
FIG. 7H depicts a schematic diagram of a modular optical switch employing a curved array of beam steering modules with a curved fold deflector according to a tenth alternative version of the third embodiment of the invention.

Multiple modules may be displaced along a curve or spline and alternatively be combined with a curved fold deflector. FIG. 7H depicts a schematic diagram of a modular optical switch 770 employing a curved array of beam steering modules with a curved fold deflector according to a tenth alternative version of the third embodiment of the invention. By way of example, the switch 770 may include first and second arrays 771, 773 of N and M modules $772_1$–$772_N$, $774_1$–$754_M$ respectively, where N and M are integers greater than or equal to 1. The modules in the arrays 771, 773 may be distributed along curves 777, 779 respectively. Alternatively, the modules $772_1$–$772_N$, $774_1$–$774_M$ may be distributed along the same curved surface or different portions of the same curved surface. The curves 777, 779 may have any 2-dimensional or 3-diemensional curved shape, including those described above with respect to FIG. 7C. The modules in the arrays 771, 773 may be optically coupled to each other via a fold deflector 776. In the exemplary version depicted in FIG. 7H, the fold deflector 776 may be a flat surface coated mirror. Alternatively the fold deflector 776 may include a refractive element, such as one or more prisms.

Fold deflector 776 may be made of a partially transparent material to allow a small percentage of light to pass behind the mirror into a photodetector array, and the photodetector array may be connected to a switch control 510 for controllably operating the input and output beam steering elements in response to the power monitoring signals generated therefrom said photodetector array.

Many different architectures are possible for the beam steering modules depicted in FIGS. 5–7H. According to a fourth embodiment of the invention a beam steering module may include one or more beam steering elements that deflect optical signals in two dimensions. Such modules can co-operate interchangeably with one or more optical components in an optical beam steering device such as an optical switch, adaptive optics, steered beam optical display, or disk drive. The beam steering elements may include a first deflector array optically coupled to a second deflector array, wherein the first and second deflector arrays co-operate to steer an optical signal in two dimensions.

Figure 8:
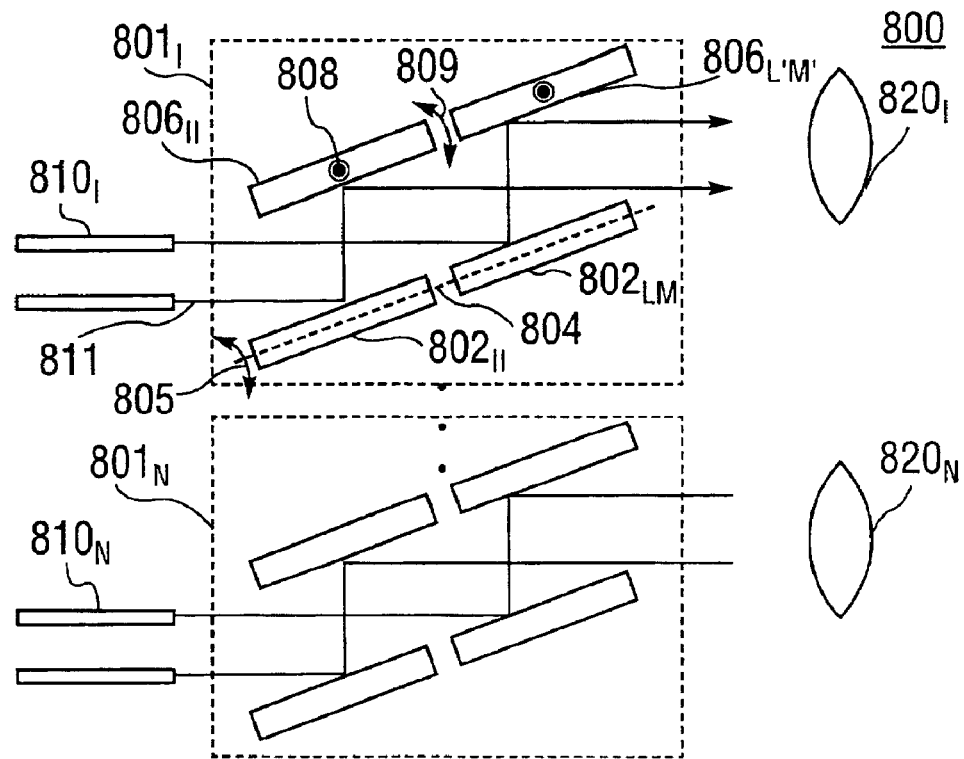
FIG. 8 depicts a schematic diagram of a first alternative version of an optical module according to a fourth embodiment of the invention.

FIG. 8 depicts a schematic diagram of a first alternative version of an optical module 800 according to a first version of the fourth embodiment of the invention. By way of example, the module 800 may generally include one or more beam steering elements, e.g., a stack of N beam steering elements $801_1 \ldots 801_N$. Each beam steering element may include a first array of one or more deflectors optically coupled to a second array of one or more deflectors. In the embodiment depicted in FIG. 8 the arrays may extend perpendicular to the plane of the drawing. The Module 800 may be coupled to one or more optical fibers $810_1 \ldots 810_N$, e.g., via individual collimators or by a collimator array.

In the exemplary embodiment depicted in FIG. 8, first array may be an L×M array of x-deflectors $802_{11} \ldots 802_{LM}$ configured to deflect light with respect to one or more first axes 804. The second array may be a L'×M' array of y-deflectors $806_{11} \ldots 806_{LM}$ configured to deflect optical signals 811 with respect to one or more second axes 808. L, M, L' and M' are all integers greater than or equal to one. According to one variation L=L' and M=M', however this need not be the case. The x-deflectors $802_{11} \ldots 802_{LM}$ may deflect the optical signals 811 from the fibers 810 to one or more of the y-deflectors $806_{11} \ldots 806_{L'M'}$. The y-deflectors $806_{11} \ldots 806_{L'M'}$ may deflect the optical signals 811 from the x-deflectors $802_{11} \ldots 802_{LM}$ toward some other optical component, such as another module or a fixed fold mirror in the case of an optical switch. In the exemplary embodiment depicted in FIG. 8 the optical signals 811 enter and exit the modules $801_i$ along substantially parallel paths. For the purposes of the present application, substantially parallel means that in traversing the modules $801_i$ the angle of deflection of the optical signals 811 is less than 90°. This is particularly advantageous where, for example it is desired to configure two or more modules in horizontal opposition.

Figure 1:
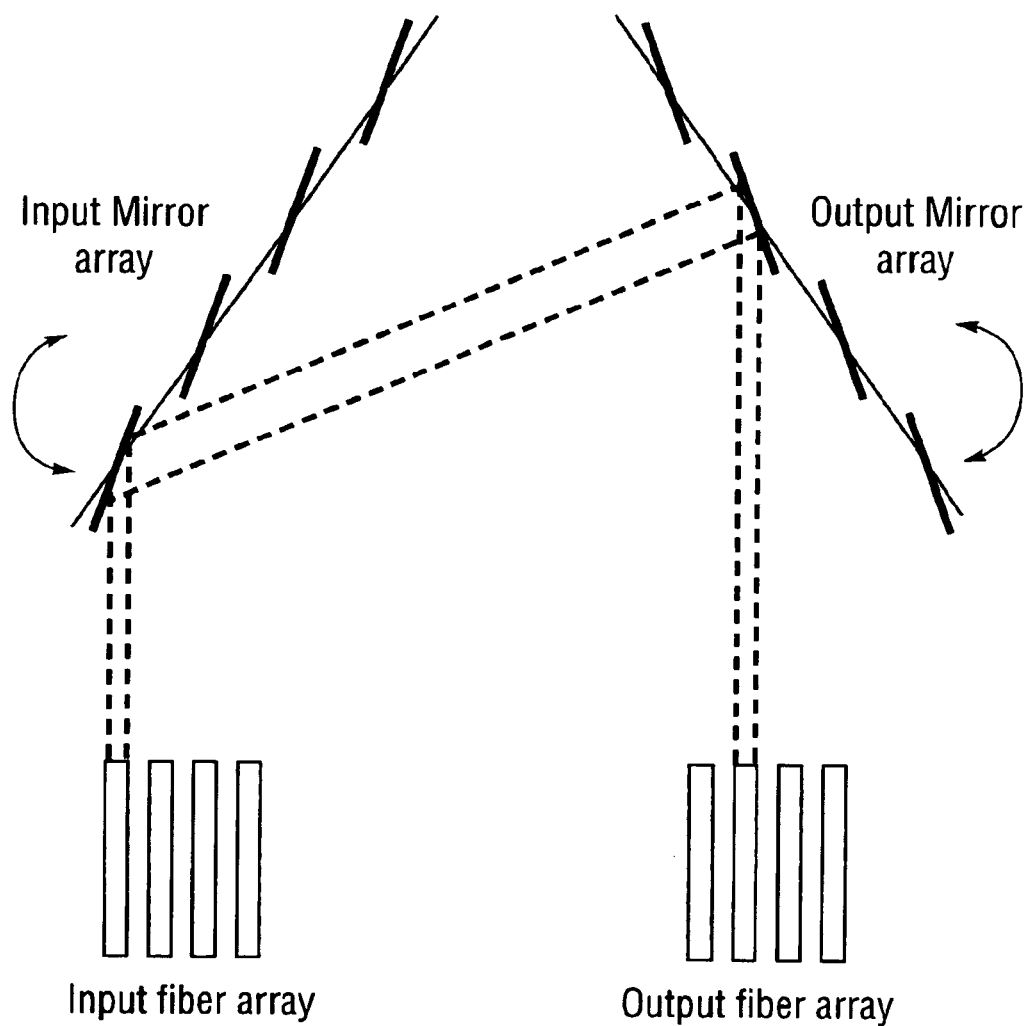
FIG. 1 depicts a one-dimensional beam steering apparatus according to the prior art.
Figure 2:
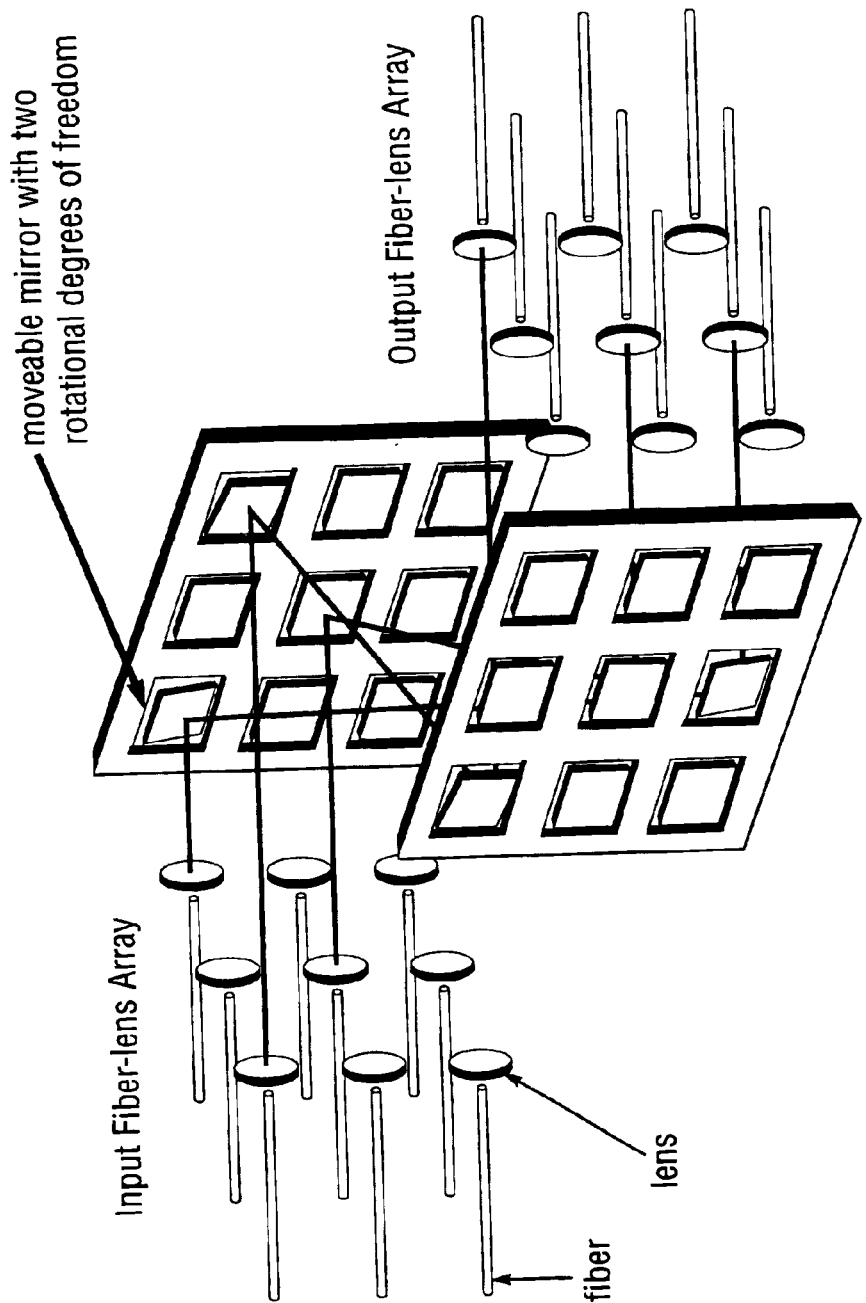
FIG. 2 depicts an isometric view of a two-dimensional beam steering apparatus according to the prior art.

By way of example and without loss of generality, the deflectors $802_{11} \ldots 802_{LM}$, $806_{11} \ldots 806_{L'M'}$ may be mirrors that rotate about axes 804, 808 as shown by the arrows 805, 809 respectively. The first and second axes 804, 808 may be perpendicular to each other and may be referred to as the x- and y-axes respectively. The invention is not limited to the specific configuration of the x- and y-axis shown in FIG. 8. For example, the relative positions of the x-deflectors and the y-deflectors may be interchanged.

Where two sets of deflectors are configured to rotate separately about different axes it is often desirable to optically couple relay optics to the deflectors. The relay optics may be placed between the x-deflectors and the y-deflectors. Such relay optics may include one or more lenses $820_1 \ldots 820_N$ or any of the alternative relay optics described above with respect to FIG. 2. In the particular version of the fourth embodiment depicted in FIG. 8, the deflectors $802_{11} \ldots 802_{LM}$, may be in a one to one correspondence with the deflectors $806_{11} \ldots 806_{L'M'}$. For the purposes of the present applications a one-to-one correspondence means that each x-deflector $802_{11} \ldots 802_{LM}$ is optically coupled to a different one of the y-deflectors $806_{11} \ldots 806_{LM}$.

Figure 9:
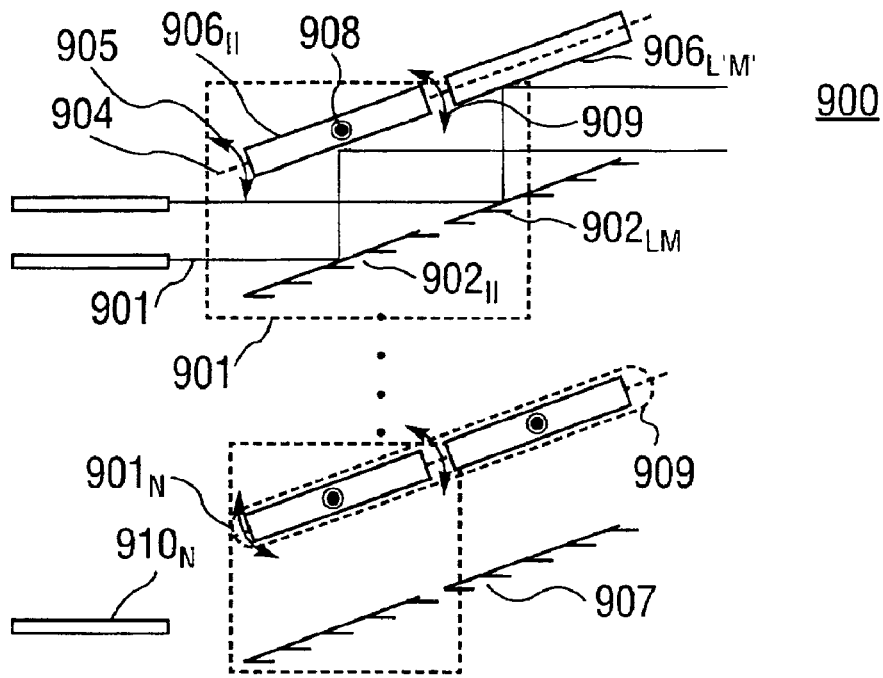
FIG. 9 depicts a schematic diagram of a second alternative version of an optical module according to the fourth embodiment of the invention.

The present invention is not limited to modules having single axis deflectors. Modules may be based on dual axis deflectors. FIG. 9 depicts a schematic diagram of an optical module 900 that employs dual axis deflectors according to a second alternative version of the fourth embodiment of the invention. By way of example, the module 900 may generally include one or more beam steering elements, e.g., a stack of N beam steering elements $901_1 \ldots 901_N$. The module 900 may be coupled to one or more optical fibers $910_1 \ldots 910_N$, e.g., via collimators. Each beam steering element $901_1$ may include an L×M array of dual axis deflectors $902_{11} \ldots 902_{LM}$ optically coupled to an L'×M' array of fixed deflectors $906_{11} \ldots 906_{L'M'}$. L, M, L' and M' are all integers greater than or equal to one. According to one variation L=L' and M=M', however this need not be the case. The deflectors $902_{11} \ldots 902_{LM}$ may be mirrors that rotate about x-axes 904, and y-axes 908 as shown by the arrows 905, 909 respectively. The first and second axes 904, 908 may be perpendicular to each other and may be referred to as the x- and y-axes respectively. The fixed $906_{11} \ldots 906_{L'M'}$ deflectors do not rotate, and may be comprised of one continuous deflector. By way of example, and without loss of generality, beam steering element $901_N$ is depicted as including a single continuous deflector 907 coupled to all of the deflectors in an array 909 of dual axis deflectors. Furthermore, the invention is not limited to the specific configuration of the fixed and dual axis deflectors shown in FIG. 9. For example, the relative positions of the fixed deflectors and the dual axis deflectors may be interchanged.

The dual axis deflectors $902_{11} \ldots 902_{LM}$ may deflect one or more optical signals 911 from the fibers 910 to one or more of the fixed deflectors $906_{11} \ldots 906_{L'M'}$. The fixed deflectors $906_{11} \ldots 906_{L'M'}$ may deflect the optical signals 911 from the x-deflectors $902_{11} \ldots 902_{LM}$ toward some other optical component, such as another module in the case of an optical switch. The optical signals 911 may enter and exit the modules $901_i$ along substantially parallel paths.

Figure 10:
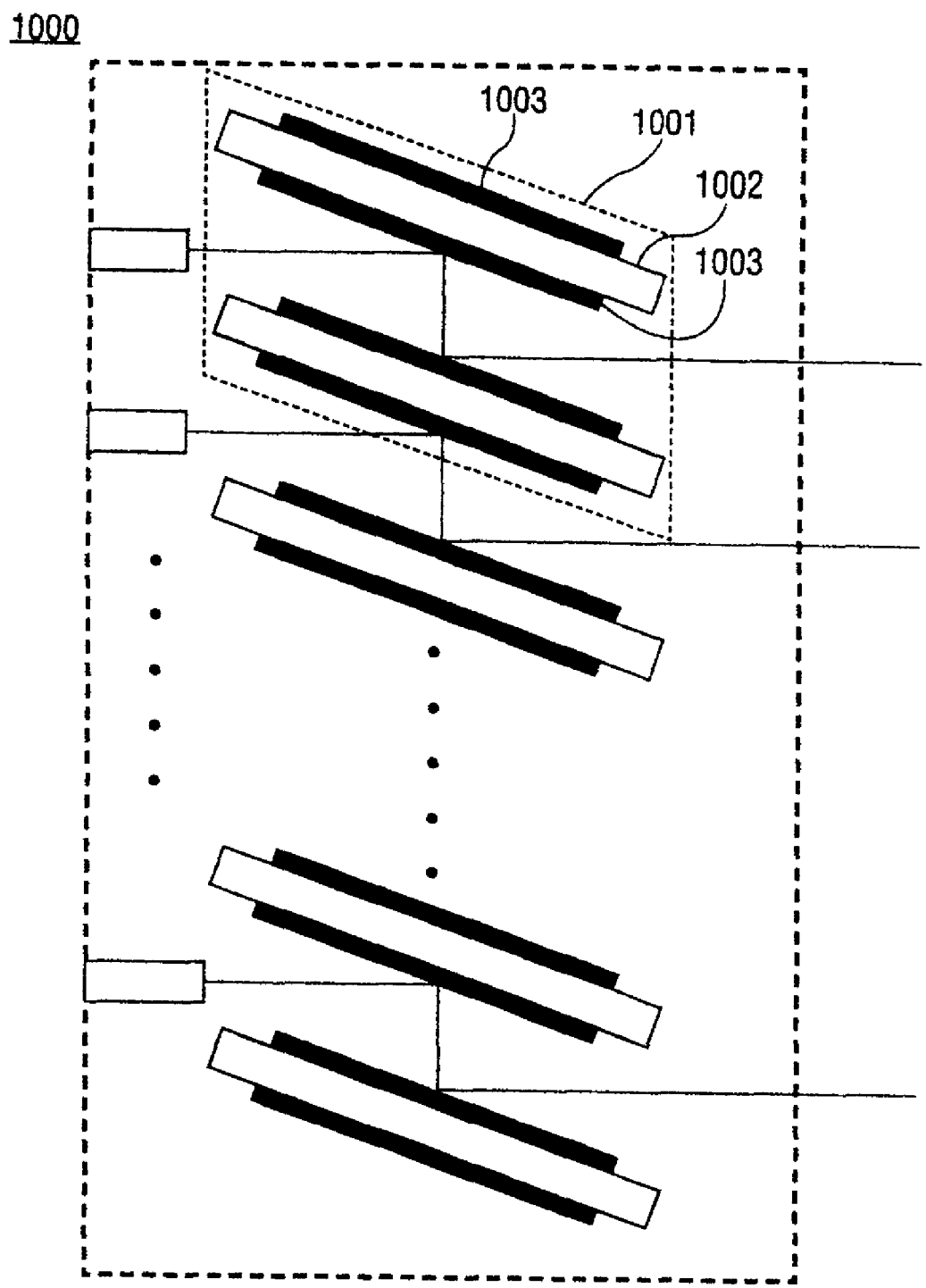
FIG. 10 depicts a cross-sectional schematic diagram of a third alternative version of an optical module according to the fourth embodiment of the invention.

Many variations are possible on the optical switches described with above with respect to FIGS. 8 and 9. For example the beam steering elements may include double-sided deflectors. FIG. 10 depicts a cross-sectional schematic diagram of an optical module 1000 that employs double sided deflectors according to a third alternative version of the fourth embodiment of the invention. The module 1000 may generally comprise a stack of N of beam steering elements 1001 containing double-sided arrays 1002 of deflectors 1003. The deflectors 1003 in the double-sided arrays 1002 may include appropriate combinations of single axis deflectors, dual axis deflectors, or fixed deflectors.

Figure 11:
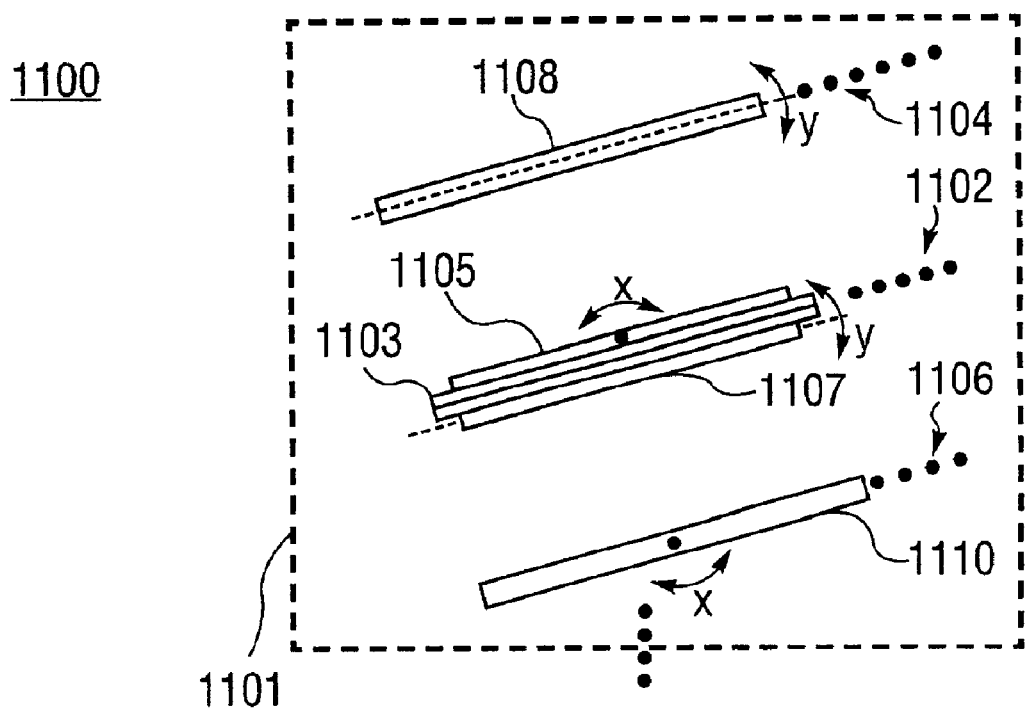
FIG. 11 depicts a cross-sectional schematic diagram of a fourth alternative version of an optical module according to the fourth embodiment of the invention.

FIG. 11 depicts a cross-sectional schematic diagram of an optical module 1100 according to a fourth alternative version of the fourth embodiment of the invention. In this version, the module 1100 may include the beam steering elements 1201 having an array 1102 of double-sided elements single-axis 1103 sandwiched between two opposing arrays 1104, 1106 of single-sided elements. In the alternative version shown in FIG. 11, each of the double-sided elements 1102 may include an x-deflector 1105 on one side and a y-deflector 1107 on the other side. The x-deflector 1105 on the double-sided element 1103 may face a single sided y-deflector 1108 in the array 1104. The y-deflector 1107 on the double-sided element 1103 may face a single sided x-deflector 1110 in the array 1106. The arrays 1102, 1104, 1106 may extend perpendicular to the plane of the drawing M deflectors deep. Although a 1×M array is depicted in FIG. 11, the beam steering elements may alternatively contain L×M arrays. N beam steering elements may be stacked in the module to produce an N×L×M beam steering module.

Figure 12:
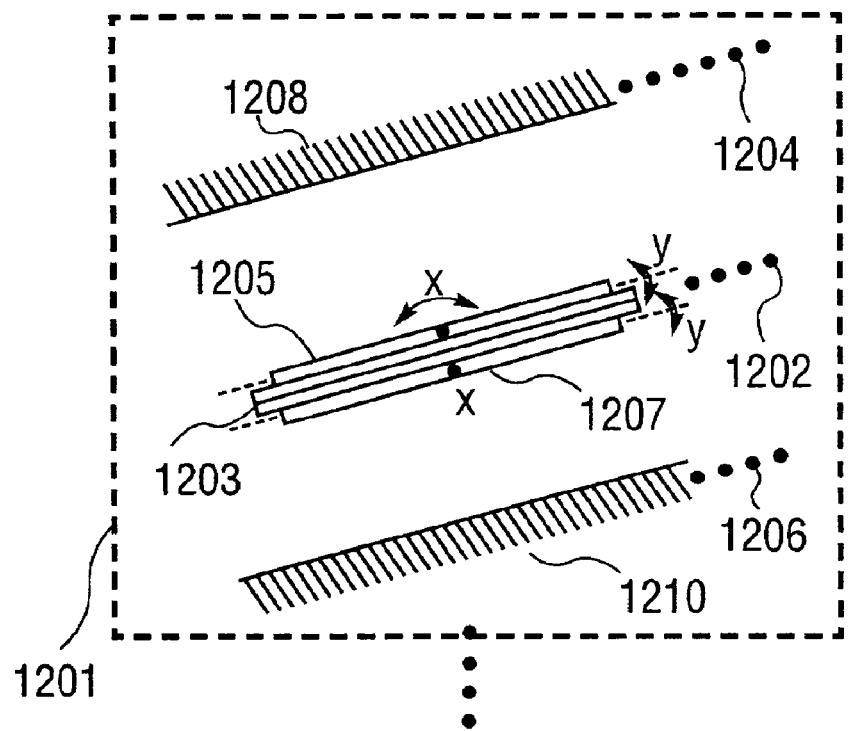
FIG. 12 depicts a cross-sectional schematic diagram of a fifth alternative version of an optical module according to the fourth embodiment of the invention.

Other configurations of double-sided deflector arrays are possible. FIG. 12 depicts a cross-sectional schematic diagram of an optical module 1200 according to a fifth alternative version of the fourth embodiment of the invention. In this version, the module 1200 may include beam steering elements 1201 having an array 1202 of double-sided dual-axis elements 1203 sandwiched between two opposing arrays 1204, 1206 of single-sided fixed deflector elements. In the alternative version shown in FIG. 12, each of the double-sided dual-axis elements 1203 may include a first gimbaled xy-deflector 1205 on one side and a second gimbaled xy-deflector 1207 on the other side. The gimbaled xy-deflectors 1205, 1207 may face single sided fixed deflectors 1208, 1210 in the arrays 1204, 1206. The fixed deflector arrays 1204, 1206 may each contain a single continuous deflector or individual deflectors coupled to the gimbaled xy deflectors 1205, 1207 in a one-to-one correspondence. The arrays 1202, 1204, 1206 may extend perpendicular to the plane of the drawing M deflectors deep. Although a 1×M array is depicted in FIG. 12, the beam steering elements may alternatively contain L×M arrays. N beam steering elements may be stacked in the module to produce an N×L×M beam steering module.

Figure 13:
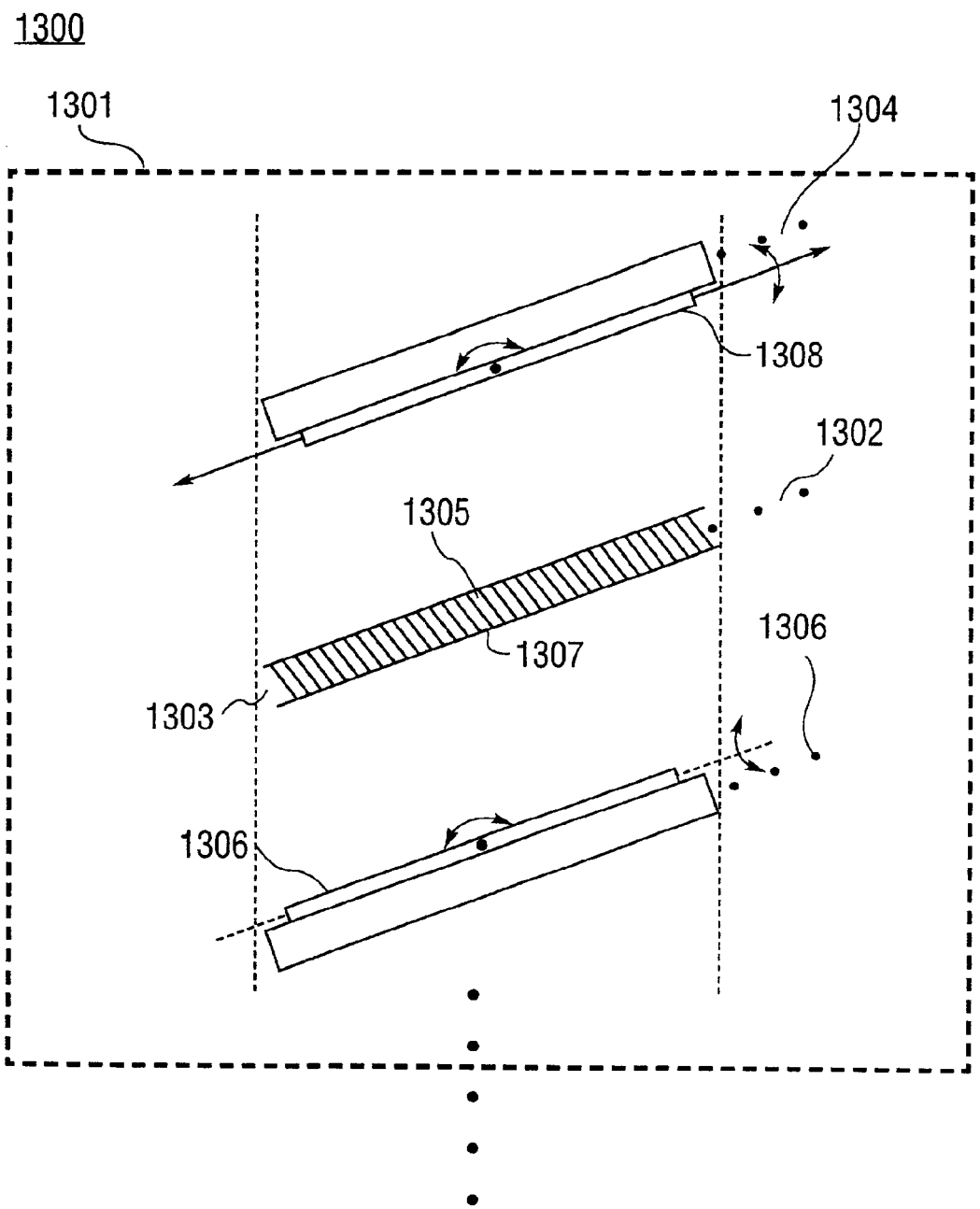
FIG. 13 depicts a cross-sectional schematic diagram of a sixth alternative version of an optical module according to the fourth embodiment of the invention.

The configuration depicted in FIG. 12 may be reversed. FIG. 13 depicts a cross-sectional schematic diagram of an optical module 1300 according to a sixth alternative version of the fourth embodiment of the invention. In this version, the module 1300 may include beam steering elements 1301 having an array 1302 of double-sided fixed elements 1303 sandwiched between two opposing arrays 1304, 1306 of single-sided dual-axis deflector elements. In the alternative version shown in FIG. 13, each of the double-sided fixed elements 1303 may include a first fixed deflector 1305 on one side and a second gimbaled fixed deflector 1307 on the other side. The fixed deflectors 1305, 1307 may face single sided gimbaled dual-axis (xy) deflectors 1308, 1310 in the arrays 1304, 1306. The fixed deflector array 1302 may contain a single continuous deflector or individual deflectors coupled to the gimbaled xy deflectors 1308, 1310 in a one-to-one correspondence. The arrays 1302, 1304, 1306 may extend perpendicular to the plane of the drawing M deflectors deep. Although a 1×M array is depicted in FIG. 13, the beam steering elements may alternatively contain L×M arrays. N beam steering elements may be stacked in the module to produce an N×L×M beam steering module.

Figure 14:
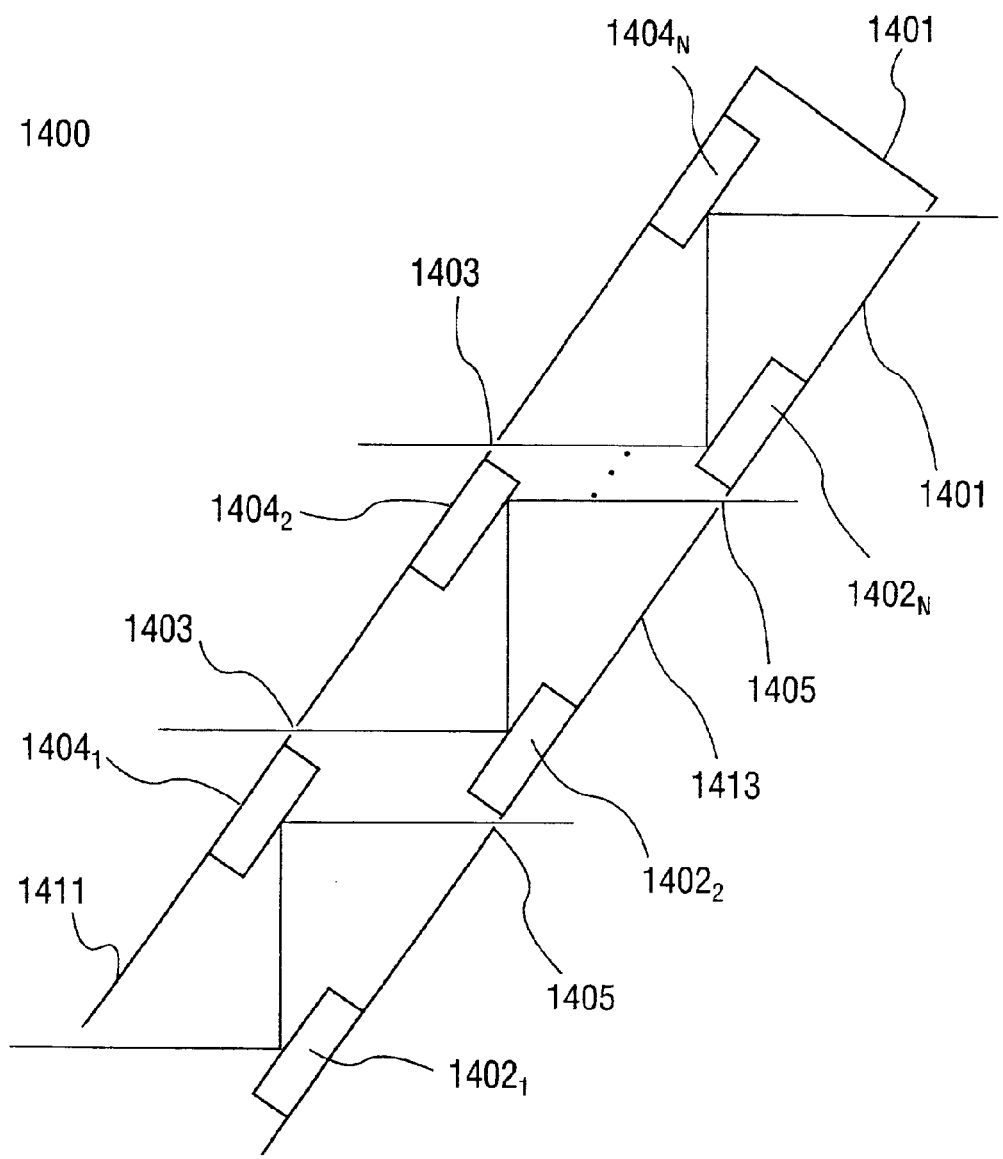
FIG. 14 depicts a cross-sectional schematic diagram of a seventh alternative version of an optical module according to the fourth embodiment of the invention.

There are still other variations on the beam steering modules of the fourth embodiment of the invention. FIG. 14 depicts a cross-sectional schematic diagram of a beam steering module 1400 according to a seventh alternative version of the fourth embodiment of the invention. The beam steering module 1400 may generally include a frame 1401 with first beam steering element having arrays of deflectors 1402 mounted to a first side 1411 of the frame 1401 and a second beam steering element having arrays of deflectors 1404 mounted to a second side 1413 of the frame 1401 opposite the first side 1411. The first and second beam steering elements may be oriented in a staggered configuration that allows optical signals to between the arrays of deflectors 1402, 1404. The frame 1401 may include a first set of holes 1403 opposite the beam steering elements 1402 that transmit optical signals through the first side of the frame 1401. The frame 1401 may include a second set of holes 1405 opposite the beam steering elements 1404 that transmit optical signals. The deflectors 1402, 1404 may be of any of the types discussed above. For example the deflectors 1402, 1404 may respectively be x-deflectors and y-deflectors or vice versa. Alternatively, the deflectors 1402, 1404 may respectively be gimbaled dual-axis (xy) deflectors and fixed deflectors or vice versa.

Figure 15:
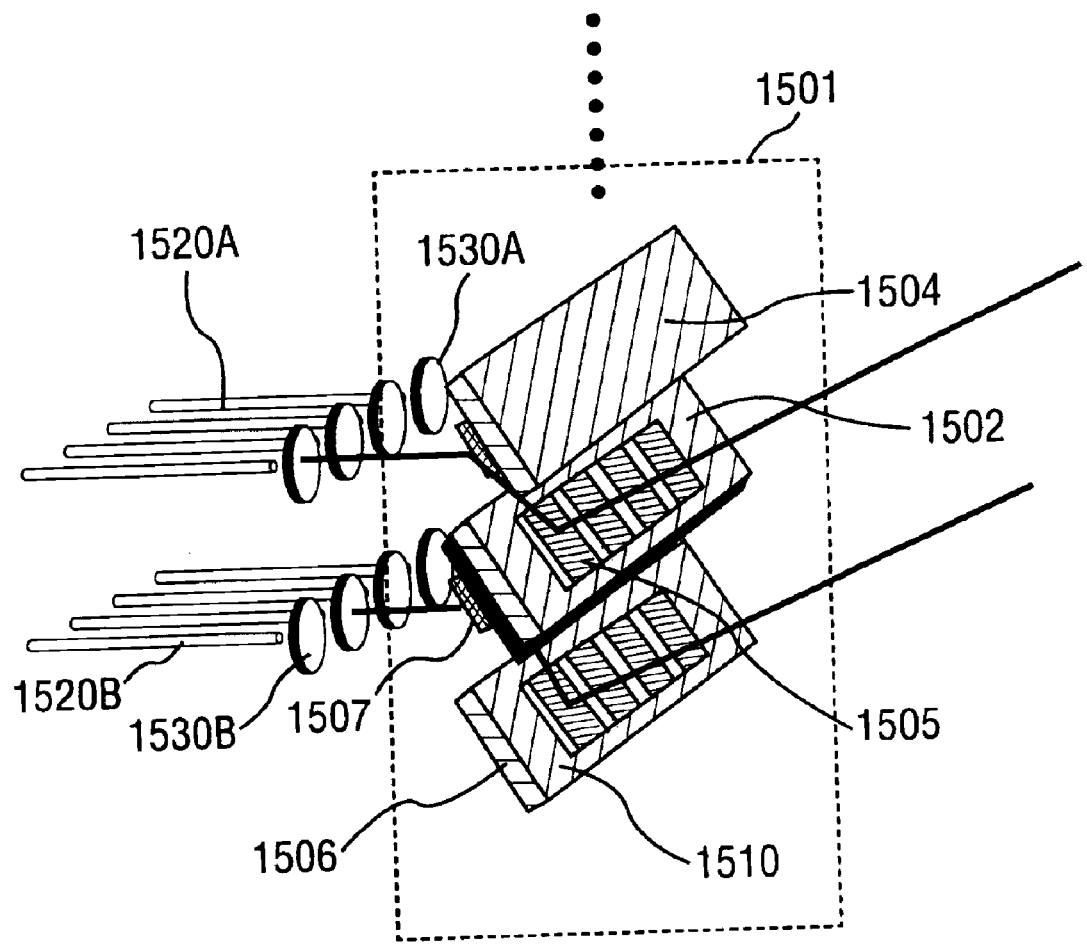
FIG. 15 depicts an isometric schematic diagram of a eighth alternative version of an optical module according to the fourth embodiment of the invention.

FIG. 15 depicts an isometric schematic diagram of an optical module 1500 that may use linear arrays of deflectors according to an eighth alternative version of the fourth embodiment of the invention. In this version, the module 1500 may include beam steering elements 1501 having a 1×M double-sided array 1502 containing deflectors 1505, 1507 sandwiched between two opposing 1×M arrays 1504, 1506 of single-sided deflectors 1508, 1510. The arrays 1502, 1504 may be coupled to optical fiber arrays $1520_A$, $1520_B$ e.g. via lens arrays $1530_A$, $1530_B$.

The deflectors 1505, 1507 may face single sided deflectors 1508, 1510 in the arrays 1504, 1506. The deflectors 1505, 1507 may be optically coupled to the single-sided deflectors 1508, 1510 in a one-to-one correspondence. N beam steering elements 1501 may be stacked in the module to produce an N×M beam steering module 1500. The deflectors 1503, 1505, 1508, 1510 may be of any of the types discussed above. For example the deflectors 1505, 1507 may respectively be x-deflectors and y-deflectors or vice versa. If so, the deflectors 1508, 1510 may respectively be y-deflectors and x-deflectors or vice versa. Alternatively, the deflectors 1505, 1507 may gimbaled dual-axis (xy) deflectors and the deflectors 1508, 1510 may be fixed deflectors or vice versa. Alternatively the double-sided deflectors 1503 may contain various mixed pairs of x-deflectors, y-deflectors, dual-axis deflectors and fixed deflectors with the single sided deflectors 1508, 1510 containing appropriate corresponding deflectors.

Figure 16:
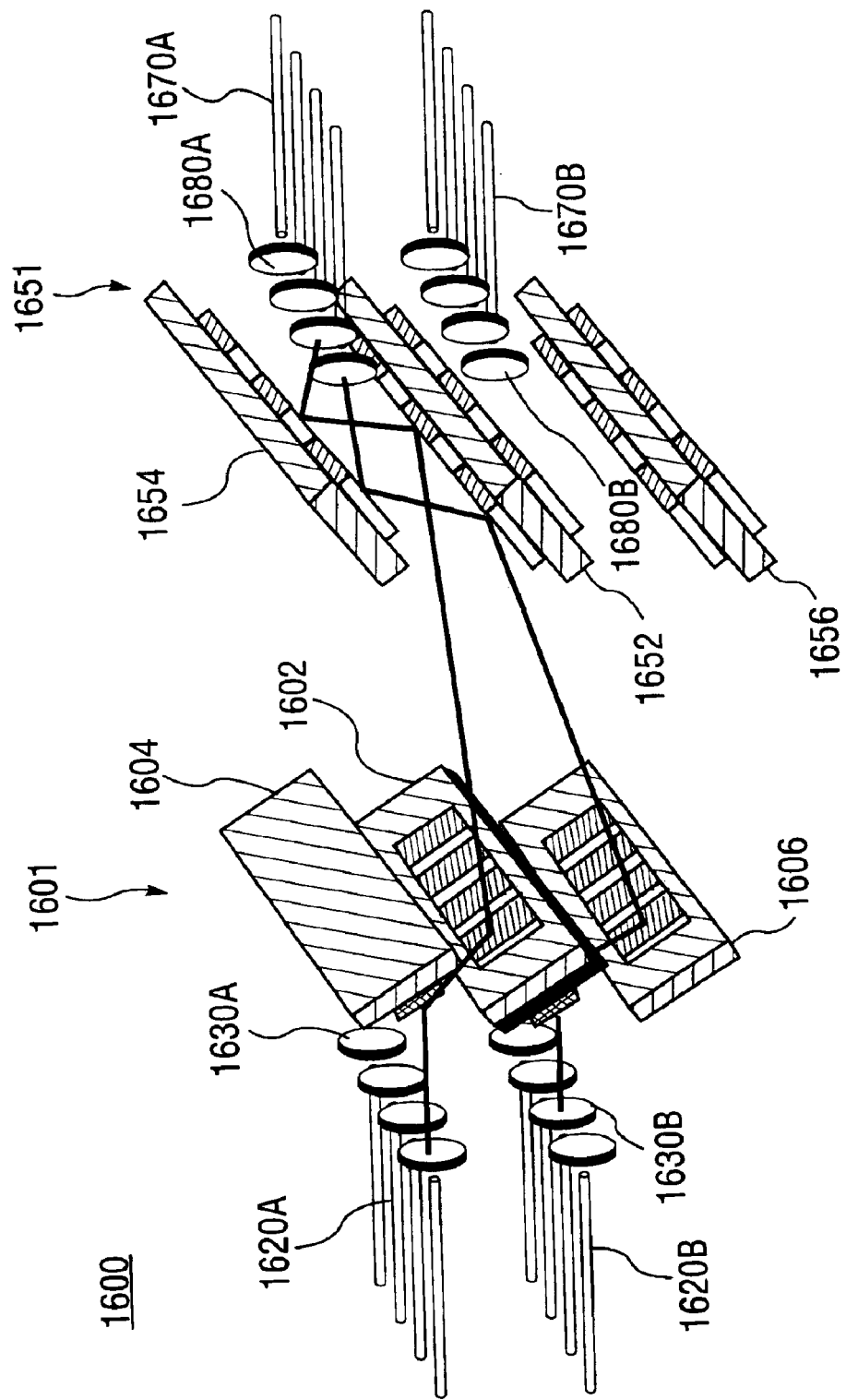
FIG. 16 depicts an isometric schematic diagram of an optical switch employing two modules of the type shown in FIG. 15.

Modules of the type depicted in FIG. 15 may be incorporated into an optical switch. FIG. 16 depicts an isometric schematic diagram of an optical switch employing two modules of the type shown in FIG. 15. The switch 1600 may generally include a first module 1601 and a second module 1651. The first and second modules may contain, respectively, N×M double-sided arrays 1602, 1652 sandwiched between opposing 1×M single-sided deflector arrays 1604, 1606, 1654, 1656. The arrays 1602, 1604, 1652 1654 may be coupled to optical fiber arrays $1620_A$, $1620_B$, $1670_A$, $1670_B$ e.g. via lens arrays $1630_A$, $1630_B$, $1680_A$, $1680_B$. The beam steering modules 1601, 1651 may selectively couple optical signals between any one of the fibers in the fiber arrays $1620_A$, $1620_B$ and any one of the fibers in the fiber arrays $1670_A$, $1670_B$.

Figure 17:
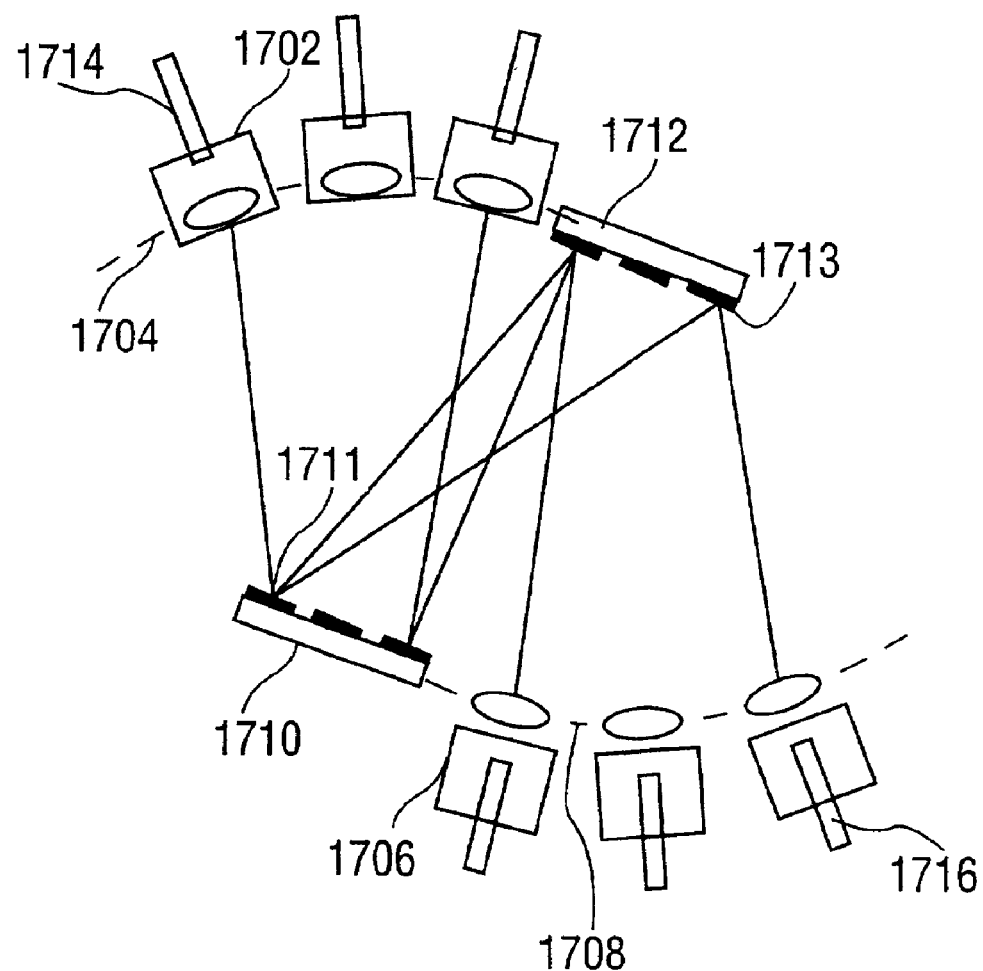
FIG. 17 depicts a cross-sectional schematic diagram of an optical switch according to a first alternative version of a fifth embodiment of the present invention.

Although much of the previous discussion had focused on modular switches, other embodiments of the application include switches that are non-modular. For example, according to a fifth embodiment of the invention, modular or non-modular beam deflectors may be combined with a curved distribution of I/O ports to increase port count in an beam steering optical switch. FIG. 17 depicts a cross-sectional schematic diagram of an optical switch 1700 according to a first alternative version of a fifth embodiment of the present invention. The switch 1700 generally comprises a first set of optical input/output (I/O) ports 1702 distributed across a first curve 1704, a second set of optical I/O ports 1706 distributed across a second curve 1708, and one or more sets of beam steering elements 1710, 1712 optically coupled between the first set of I/O ports and the set of I/O ports. First and second sets of optical fibers 1714, 1716 may be optically coupled respectively to the first and second sets of I/O ports 1702, 1706. The beam steering elements each may contain one or more deflectors 1711, 1713. By way of example and without loss of generality, the deflectors 1711, 1713 may be single axis deflectors, dual-axis deflectors, fixed deflectors, or some combination of any or all of these. In the case where single axis deflectors are used, the switch 1700 may include relay optics, e.g. as described elsewhere herein.

The curved distribution of the I/O ports allows a greater number of ports to be coupled closer together, thereby increasing the port count for the optical switch 1700. By way of example, the curves 1704, 1708 may be in the shape of a segment of a circle, parabola, ellipse, hyperbola, cycloid, or any other suitable curved shape. Alternatively, one of the curves 1704, 1708 could be a segment of a straight line. Although one-dimensional curved I/O port distributions are depicted in FIG. 17 for the sake of clarity, the switch 1700 may employ two-dimensional curved arrays of I/O ports, e.g. ports distributed across a curved three-dimensional surface. By way of example, the shape of the curved surface may be cylindrical, spherical, paraboloidal, ellipsoidal, hyperboloidal or any other suitable curved three-dimensional shape. Alternatively, one of the arrays of I/O ports could be arranged in a planar array. Furthermore, although beam steering elements having planar arrays of deflectors are depicted in FIG. 17, the invention is in no way limited to this particular configuration. The beam steering elements may alternatively be curved arrays of deflectors. Furthermore, the deflectors may scan "one way" or "two way" as required by the specific application of the switch 1700.

Figure 18:
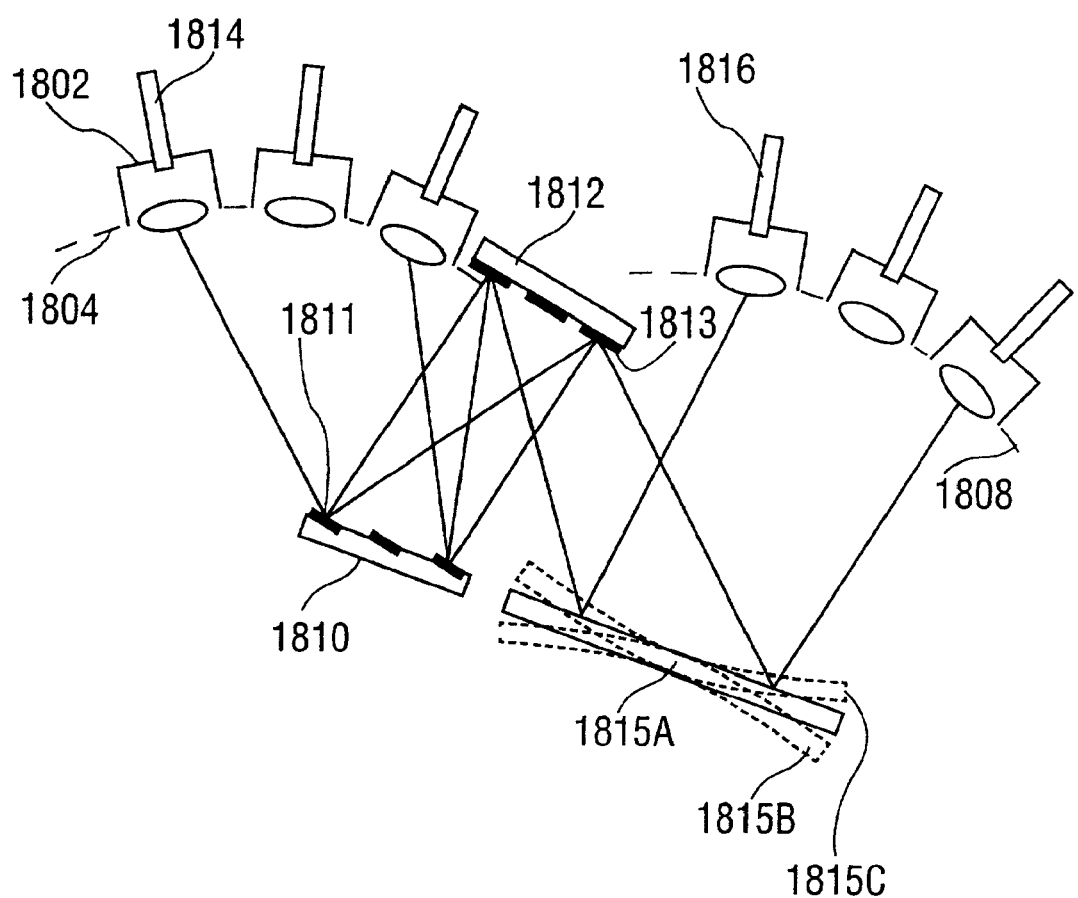
FIG. 18 depicts a cross-sectional schematic diagram of an optical switch employing a fold deflector according to a second alternative version of a fifth embodiment of the present invention.

FIG. 18 depicts a cross-sectional schematic diagram of an optical switch 1800 that may employ a fold deflector according to a second alternative version of the fifth embodiment of the present invention. The switch 1800 may generally comprise a first set of optical input/output (I/O) ports 1802 distributed across a first curve 1804, a second set of optical I/O ports 1806 distributed across a second curve 1808, and one or more sets of beam steering elements 1810, 1812 optically coupled between the first set of I/O ports and the set of I/O ports. First and second sets of optical fibers 1814, 1816 may be optically coupled respectively to the first and second sets of I/O ports 1802, 1806. The beam steering elements may each contain one or more deflectors 1811, 1813. The second set of I/O ports may be coupled to the beam steering elements 1810, 1812 via a fold deflector 1815. The fold deflector may allow the first and second sets of I/O ports to be arranged on the same side of the beam steering elements. By way of example and without loss of generality, the deflectors 1811, 1813 may be single axis deflectors, dual-axis deflectors, fixed deflectors, or some combination of any or all of these. In the case where single axis deflectors are used, the switch 1800 may include relay optics, e.g. as described below. Although a planar fold deflector is depicted in FIG. 18, the fold deflector may alternatively be curved, in a manner analogous to that depicted in FIG. 7F. By way of example, the shape of the fold deflector 1815 may be cylindrical, spherical, paraboloidal, ellipsoidal, hyperboloidal or any other suitable curved three-dimensional shape. Such a curved fold deflector may be convex fold deflector 1815B as shown in phantom or a concave fold deflector 1815C as shown in phantom.

Figure 19:
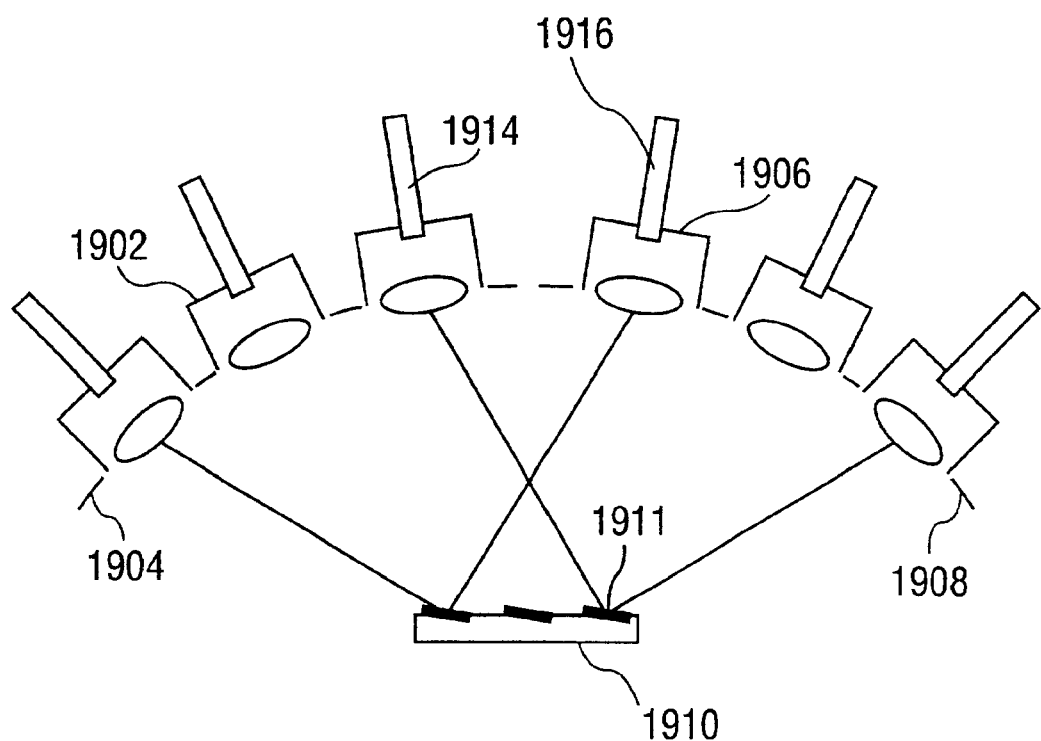
FIG. 19 depicts a cross-sectional schematic diagram of an optical switch employing dual axis deflectors with a fold deflector according to a fourth alternative version of a fifth embodiment of the present invention.

There may be certain advantages in the particular case that an optical switch according the fifth embodiment of the invention includes dual-axis deflectors. FIG. 19 depicts a cross-sectional schematic diagram of an optical switch 1900 employing dual-axis deflectors according to a third alternative version of the fifth embodiment of the present invention. The switch 1900 may generally comprise a first set of optical input/output (I/O) ports 1902 distributed across a first curve 1904, a second set of optical I/O ports 1806 distributed across a second curve 1908, and one or more of beam steering elements 1910 containing dual-axis deflectors 1911 optically coupled between the first set of I/O ports and the set of I/O ports. First and second sets of optical fibers 1914, 1916 may be optically coupled respectively to the first and second sets of I/O ports 1902, 1906. The dual-axis deflectors may be employed without relay optics.

Figure 20:
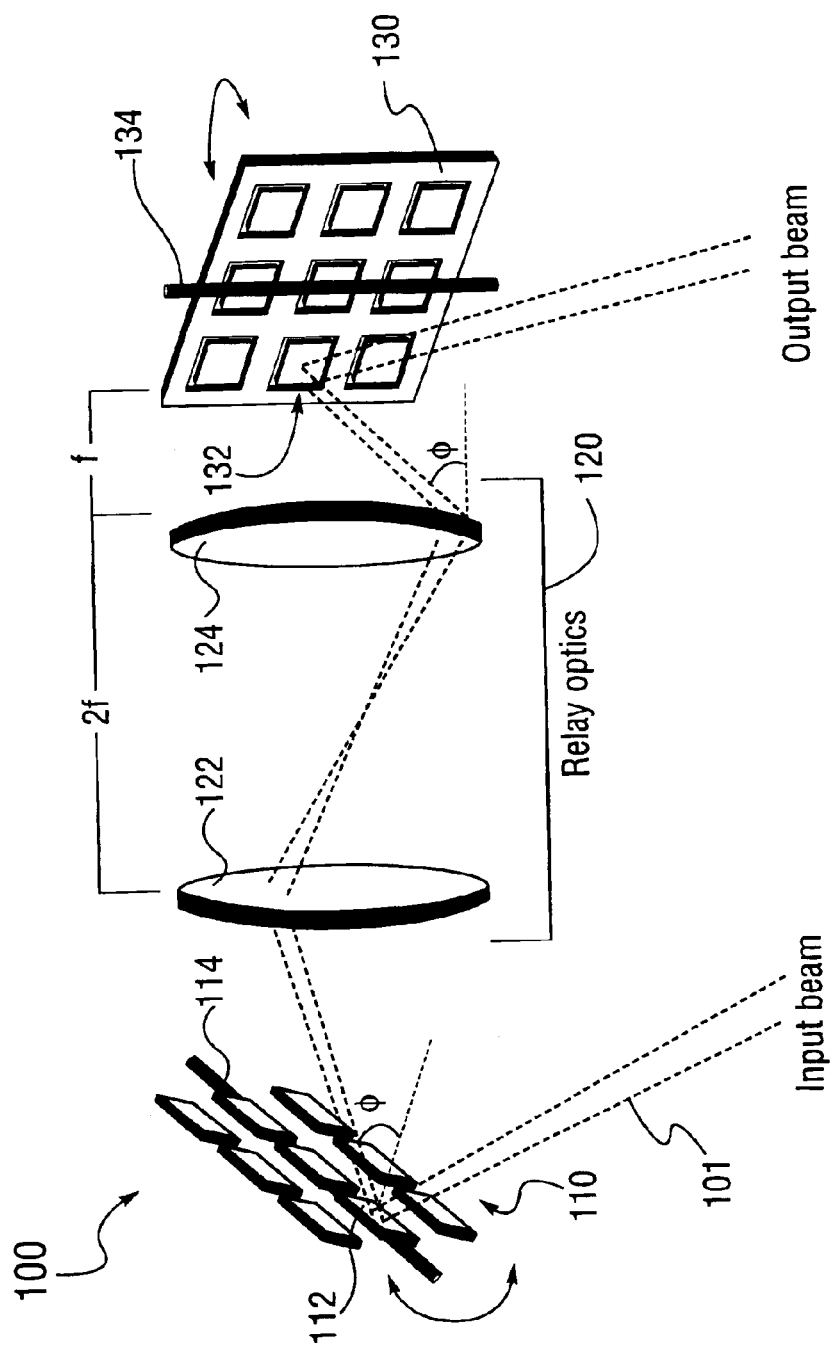
FIG. 20 depicts a simplified schematic diagram of an optical beam steering module according to an embodiment of the present invention.

The above embodiments may use relay optics. An example of a beam steering module 100 using relay optics according to a first embodiment of the invention is depicted in FIG. 20. The steering module 100 generally comprise two 2-dimensional mirror arrays 110, 130 and relay optics 120 disposed along an optical path between the mirror arrays. The mirror arrays 110, 130 each typically comprise N×M arrays of single axis mirrors 112, 132. Generally N and M are integers greater than one. In the special case of square arrays, N=M.

In the present application, a single axis mirror refers to a moveable mirror configured to rotate about a single axis. Mirrors 112 and 132 rotate about axes 114, 134 that are different. Typically, mirrors 112 and mirrors 132 rotate about axes 114, 134 that are substantially orthogonal to each other. For example, mirrors 112 are configured to rotate about axes 114, oriented in a substantially horizontal plane. Mirrors 132 are configured to rotate about axis 134 oriented in a substantially vertical plane.

An input light beam 101 from a input fiber in a given row and column of an N×M input fiber array (not shown) impinges on a given mirror 112 in array 110. Mirrors 112 and 132 deflect the light beam 101 towards a fiber in an N×M output fiber array (not shown). Those skilled in the art will recognize that because the propagation of light is reversible, the role of input and output fibers may be reversed.

In an exemplary embodiment, relay optics 120 comprises a first focusing element 122 and a second focusing element 124 in a confocal configuration. For the purposes of this application the "focusing element" encompasses optical elements capable of focusing light. Such elements include refractive elements such as lenses, reflective elements such as mirrors, diffractive elements and micro-optical elements. Lenses include simple lenses and compound, i.e. multiple element lenses, graded refractive index (GRIN) lenses, ball lenses, and the like. Diffractive elements include Fresnel lenses and the like. In a confocal configuration, focusing elements 122 and 124 are characterized by the substantially same focal length f and separated from each other by a distance substantially equal to 2f. Furthermore, array 110 is located a distance f from focusing element 122 and array 130 is located a distance substantially equal to f away from focusing element 124.

Relay optics 120 image mirror array 110 onto mirror array 130. The angle of beam 101 may be controlled with respect to both axes 114 and 134 by adjusting the angle of the appropriate mirrors in the arrays 110 and 130. For example, beam 101 emerges from mirror array 110 at an angle $\phi$ with respect to the object plane of relay optics 120. The object plane of relay optics 120 is typically located proximate mirror array 110. The image plane of relay optics 120 is typically located proximate mirror array 130. Relay optics 120 are configured to ensure that beam 101 impinges on the image plane of relay optics 120 at the same angle $\phi$. In other words, light beam 101 enters and leaves relay optics 120 at the same angle. Furthermore, parallel light entering relay optics 120 leaves as parallel light. Alternatively the angle beam 101 makes with the image plane may be related to the angle beam 101 makes with the object plane by some other predetermined relationship.

Steering module 100 may be used for beam steering in small port-count switches or if loss is not critical. Alternatively, module 100 may be used to switch beam 101 from input fibers in an N×M array to a grid or array of photodetectors. Mirrors in array 110 deflect light beam 101 to the row containing the desired output fiber or detector. Mirrors in array 130 deflect beam 101 to the desired column on that row.

Figure 21:
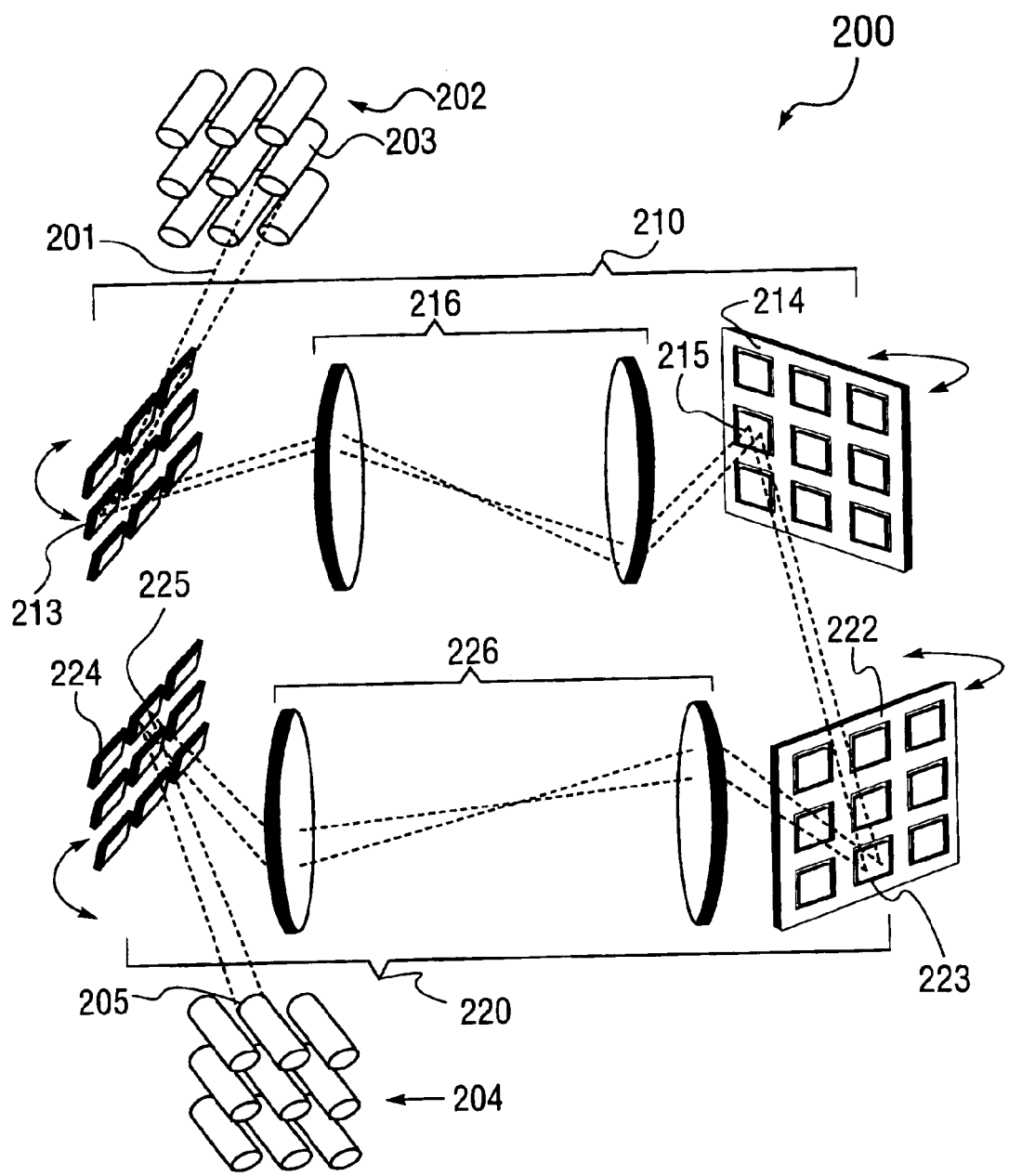
FIG. 21 depicts a simplified schematic diagram of an optical switch according to an embodiment of the present invention.

FIG. 21 depicts a steered beam switching system 200 according to a second embodiment of the invention. If port count becomes sufficiently on module 100, large losses may occur due to light entering the fibers at two great an angle. To overcome this, the system 200 that utilizes two modules of the type shown in FIG. 21 to ensure that beam 101 enters the output fiber at the correct angle.

The system 200 generally comprises a first module 210 coupled to an N×M input fiber array 202 and a second module 220 coupled to an output fiber array 204. Modules 210 and 220 determine, at the plane of output fiber array 204, the position and angle of an optical beam emerging from any of the input fibers in input fiber array 202. Modules 210 and 220 have features in common with module 100 of FIG. 21. Module 210 comprises single axis mirror arrays 212, 214 and relay optics 216. Mirrors in arrays 212 and 214 rotate about mutually orthogonal axes. Module 220 comprises single axis mirror arrays 222, 224 and relay optics 226. Mirrors in arrays 222 and 224 rotate about mutually orthogonal axes.

Figure 22:
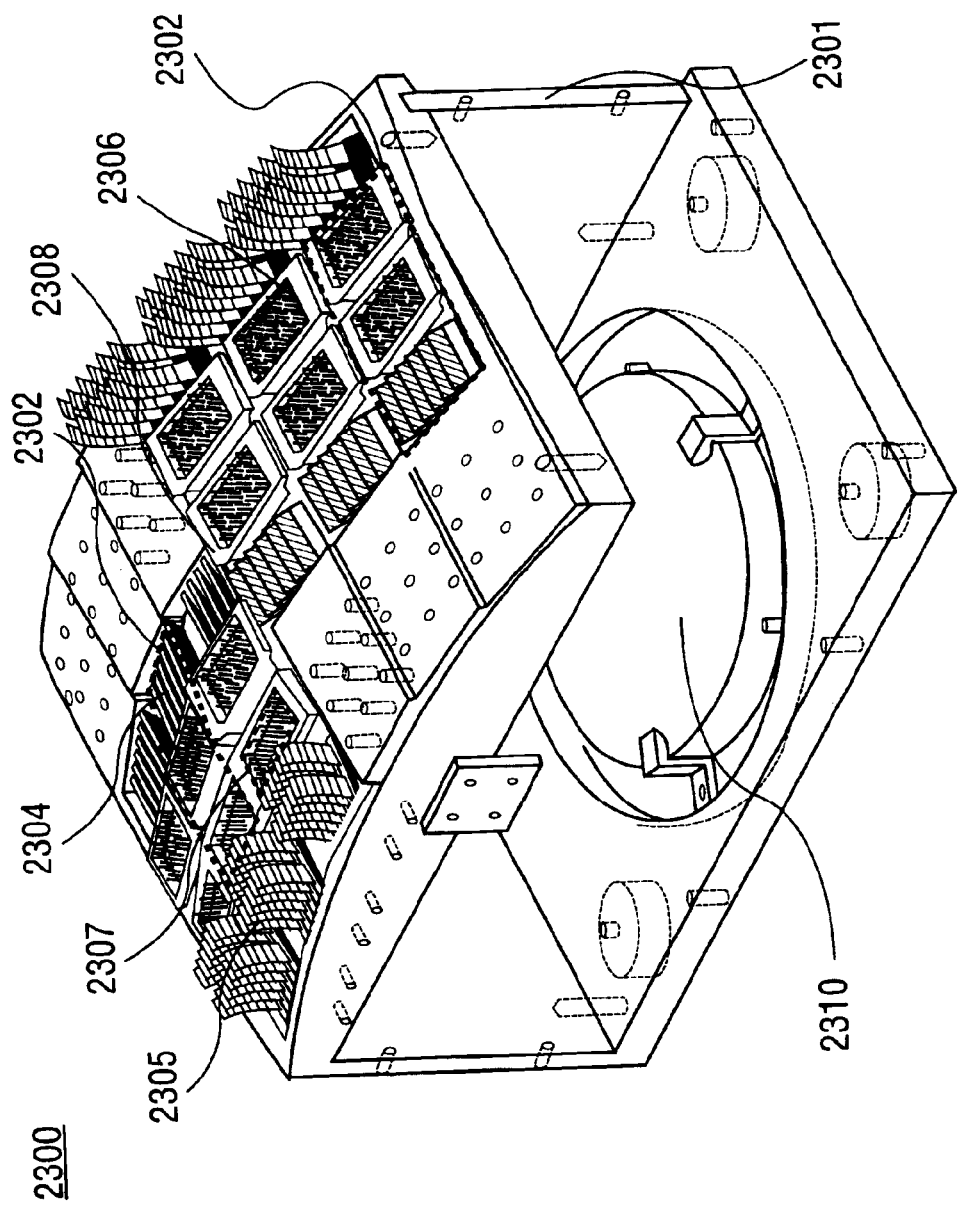
FIG. 22 depicts a simplified isometric diagram of an optical switch according to an embodiment of the present invention.

In the exemplary embodiment depicted in FIG. 22 mirrors in arrays 214 and 222 rotate about substantially parallel axes. A light beam 201 from a fiber 203 in input fiber array 202 couples to a corresponding mirror 213 in mirror array 212. Mirror 215 steers light beam 201 to a mirror 215 in array 214. Relay optics 216 preserve the angle that light beam 201 makes at with respect to an image plane of relay optics 216. Mirror 215 deflects light beam 201 to a mirror 223 on array 222. Mirror 223 steers light beam 201 to a mirror 225 in array 224. Relay optics 226 preserve the angle that light beam 201 makes at with respect to an image plane of relay optics 226. Mirror 225 deflects light beam 201 to a corresponding fiber 205 in output fiber array 204.

Those skilled in the art will recognize that by suitable manipulation of mirrors 213, 215, 223, and 225 any fiber in input array 202 may be coupled to any fiber in output array 204.

Figure 23:
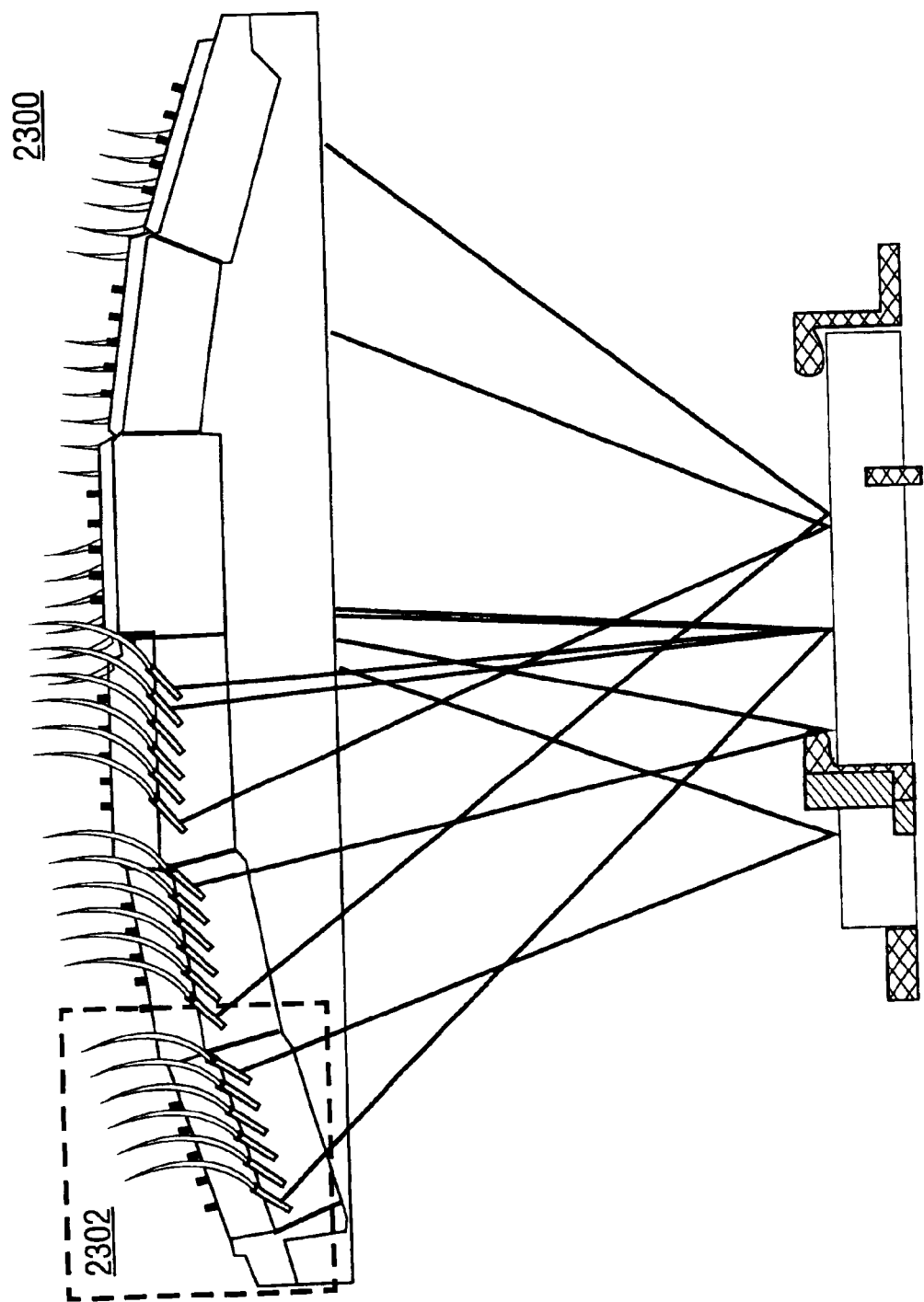
FIG. 23 depicts a cross-sectional diagram of the optical switch of FIG. 23.

An exemplary embodiment of an optical switch 2300 employing various features described above is depicted in FIGS. 22 and 23. The switch 2300 generally comprises a plurality of beam steering modules 2302 attached to a case 2301. The modules are disposed along a curved upper surface of the housing 2301. Each beam steering module 2302 includes beam steering elements made up of alternating stacked arrays x-axis and y-axis beam steering mirrors 2304 2308. By way of example the beam steering mirrors 2304 may be single axis mirrors that alternately rotate about x and y axes. The beam steering mirrors 2304 may be electrically connected to a controller by ribbon cables 2305, which are not considered part of the modules 2302. Optical signals from optical fibers 2303 are coupled to the beam steering elements by N×M groups of collimators 2306 disposed in holes in housings 2307 mechanically coupled to modules and optically coupled to beam steering elements. For clarity, some of the housings are have been removed to expose the beam steering elements. The modules are optically coupled to each other via a fold mirror 2310, which is fixed to the case 2301.

It will be clear to one skilled in the art that the above embodiment may be altered in many ways without departing from the scope of the invention. For example, although in the above embodiments, the mirrors are described as MEMS mirrors other mirrors such as bulk mirrors or large-area deformable mirrors may be used. Accordingly, the scope of the invention should be determined by the following claims and their legal equivalents.

What is claimed is:

1. A beam steering module comprising:

one or more beam steering elements including a first and second deflector array, wherein the one or more beam steering elements deflect one or more optical signals in two dimensions, wherein one or more of the first and second deflector arrays includes an L×M array of deflectors, where L and M are integers greater than or equal to one wherein N first and second deflector arrays are stacked to form an N×L×M beam steering module, where N is an integer greater than or equal to 1.

wherein one or more of the beam steering elements includes a frame, wherein the first and second deflector arrays are coupled to opposite sides of the frame in a staggered configuration.

2. The module of claim 1 wherein the frame includes one or more holes between the two or more arrays on at least one side of the frame.

3. A beam steering module comprising:

one or more beam steering elements including a first and second deflector array, wherein the one or more beam steering elements deflect one or more optical signals in two dimensions wherein one or more of the first and second deflector arrays includes an L×M array of deflectors, where L and M are integers greater thanor equal to one wherein N first and second deflector arrays are stacked to form an N×L×M beam steering module, where N is an integer greater than or equal to 1, wherein at least one of the first and second deflector arrays is a double-sided array.

4. The module of claim 3, wherein the double sided array includes two substrates back-to-back, wherein each substrate has one or more deflectors on one side.

5. The module of claim 4 wherein the back-to-back substrates are separated by an air gap.

6. The module of claim 3, wherein the double sided array includes a single substrate having one or more deflectors on each side thereof.

7. The module of claim 3 wherein the first array includes one or more deflectors configured to rotate about a single first axis.

8. The module of claim 7 further comprising relay optics optically coupled to one or more of the first and second deflector arrays.

9. The module of claim 7 wherein the second array includes one or more deflectors configured to rotate about a single second axis.

10. The module of claim 9 wherein the first axis is substantially perpendicular to the second axis.

11. The module of claim 9 wherein the deflectors in the first and second arrays are optically coupled in a one-to-one correspondence.

12. The module of claim 9 wherein N first and second deflector arrays are stacked.

13. The module of claim 9 further comprising relay optics optically coupled to one or more of the first and second deflector arrays.

14. The module of claim 7 wherein the double-sided array includes one or more deflectors on one side configured to rotate about a first axis and one or more deflectors on another side configured to rotate about a second axis.

15. The module of claim 7 wherein N of said double-sided arrays are stacked, wherein N is an integer greater than 1.

16. A beam steering module comprising:
one or more beam steering elements including a first and second deflector array, wherein the one or more beam steering elements deflect one or more optical signals in two dimensions,
wherein one or more of the first and second deflector arrays includes and L×M array of deflectors, where L and M are integers greater than or equal to one
wherein N first and second deflector arrays are stacked to form an N×L×M beam steering module, where N is an integer greater than or equal to 1.
wherein the first deflector array includes one or more dual-axis deflectors configured to rotate about a first axis and a second axis.

17. The module of claim 16 wherein the second array includes one or more fixed deflectors.

18. The module of claim 16, wherein the one or more dual-axis deflectors includes one or more double-sided dual axis deflectors.

19. The module of claim 18, wherein the one or more double-sided dual axis deflectors includes two substrates back-to-back, wherein each substrate has one or more deflectors on one side.

20. The module of claim 19 wherein the back-to-back substrates are separated by an air gap.

21. The module of claim 18, wherein the one or more double-sided dual-axis deflectors includes a single substrate having one or more deflectors on each side thereof.

22. The module of claim 16 wherein the second deflector array includes one or more double-sided fixed deflectors.

23. The module of claim 22, wherein the one or more double-sided fixed deflectors includes two substrates back-to-back, wherein each substrate has one or more deflectors on one side.

24. The module of claim 23 wherein the back-to-back substrates are separated by an air gap.

25. The module of claim 22, wherein the one or more double-sided fixed deflectors includes a single substrate having one or more deflectors on each side thereof.

26. An optical switch, comprising:
a first beam steering module;
a second beam steering module optically coupled to the first beam steering module;
wherein at least one of the first and second beam steering modules includes at least one beam steering element,
wherein the at least one beam steering element deflects an optical signal in two dimensions,
wherein the at least one beam steering element includes a stack containing one or more first deflector arrays optically coupled to one or more second deflector arrays
wherein one or more of the first and second deflector arrays includes a double sided array,
wherein the double sided array has on one side one or more deflectors configured to rotate about a single first axis, the double sided array having on another side one more deflectors configured to rotate about a single second axis; or
wherein the double sided array has on one side one or more deflectors configured to rotate about a first axis and a second axis, the double sided array having on another side one more fixed deflectors.

27. The switch of claim 26 further comprising relay optics optically coupled to one or more of the first and second beam steering elements.

28. The switch of claim 27, further comprising relay optics coupled to one or more of the first and second modules.

29. The switch of claim 27 wherein the first and second beam steering modules are part of a plurality of first and second beam steering modules disposed along a curved surface.

30. The switch of claim 29 further comprising a fold deflector optically coupled between the first and second beam steering modules.

31. The switch of claim 30 wherein the fold deflector is partially transparent.

32. The fold deflector of claim 31, further comprising a photodetector array optically coupled to the partially transparent fold deflector.

33. The switch of claim 26 wherein the first and second beam steering modules are part of a plurality of first and second beam steering modules disposed along a curved surface.

34. The switch of claim 33 further comprising a fold deflector optically coupled between the first and second beam steering modules.

35. The switch of claim 26 wherein the first and second beam steering modules are part of a plurality of first and second beam steering modules disposed along a curved surface.

36. The switch of claim 35 further comprising a fold deflector optically coupled between the first and second beam steering modules.

37. The switch of claim 26, further comprising a fold deflector optically coupled between the first and second beam steering modules.

38. The switch of claim 37, wherein the fold deflector is a curved fold mirror.

39. The switch of claim 38, wherein the first and second modules are arranged in a substantially planar configuration.

40. The switch of claim 38, wherein the first and second modules are arranged in a substantially curved configuration.

41. The switch of claim 26 wherein the first and second modules are arranged in a substantially planar configuration.

42. An optical switch, comprising:
a first beam steering module;
a second beam steering module optically coupled to the first beam steering module;
wherein at least one of the first and second beam steering modules includes at least one beam steering element,
wherein the at least one beam steering element deflects an optical signal in two dimensions,
wherein the first and second modules are arranged in a substantially curved configuration.

43. The switch of claim 42, further comprising a fold deflector coupled to the at least one beam steering module.

* * * * *